United States Patent
He et al.

(10) Patent No.: US 12,451,519 B2
(45) Date of Patent: Oct. 21, 2025

(54) FLAME-RESISTANT QUASI-SOLID ELECTROLYTE FOR LITHIUM-ION AND LITHIUM METAL BATTERIES AND PRODUCTION METHOD

(71) Applicant: Global Graphene Group, Inc., Dayton, OH (US)

(72) Inventors: Hui He, Dayton, OH (US); Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 379 days.

(21) Appl. No.: 17/144,754

(22) Filed: Jan. 8, 2021

(65) Prior Publication Data
US 2022/0223917 A1    Jul. 14, 2022

(51) Int. Cl.
*H01M 10/00*    (2006.01)
*H01M 4/505*    (2010.01)
(Continued)

(52) U.S. Cl.
CPC ....... *H01M 10/0569* (2013.01); *H01M 4/505* (2013.01); *H01M 4/525* (2013.01); *H01M 4/583* (2013.01); *H01M 4/661* (2013.01); *H01M 4/663* (2013.01); *H01M 10/0525* (2013.01); *H01M 10/0562* (2013.01); *H01M 10/0567* (2013.01); *H01M 2300/0037* (2013.01); *H01M 2300/0071* (2013.01)

(58) Field of Classification Search
CPC ......... H01M 10/0569; H01M 10/0525; H01M 10/0562; H01M 10/0567; H01M 4/66; H01M 4/525
See application file for complete search history.

(56) References Cited

U.S. PATENT DOCUMENTS

| 2,798,878 A | 7/1957 | Hummers |
| 5,532,077 A | 7/1996 | Chu |
| 9,368,831 B2 | 6/2016 | He et al. |

FOREIGN PATENT DOCUMENTS

| CN | 111916661 A | * 11/2020 | ............ H01M 4/131 |
| JP | 2004247152 A | * 9/2004 | ............ Y02E 60/50 |
| JP | 4569063 B2 | * 10/2010 | ............ Y02E 60/10 |

OTHER PUBLICATIONS

Bando et al., Polymer Solid Electrolyte and Polymer Solid Electrolyte Lithium Battery, Oct. 2010, See the Abstract. (Year: 2010).*

(Continued)

*Primary Examiner* — Anca Eoff
*Assistant Examiner* — Monique M Wills

(57) ABSTRACT

An electrolyte, comprising: (a) a polymer, which is a polymerization or crosslinking product of a reactive additive, wherein the reactive additive comprises at least one reactive polymer, reactive oligomer, or reactive monomer and a curing agent or initiator and wherein the reactive polymer, oligomer, or monomer comprises at least a reactive carboxylic and/or a hydroxyl group; (b) a lithium salt; and (c) an organic liquid solvent or ionic liquid. The polymer preferably comprises a cross-linked network of chains from poly (acrylic acid), poly(vinyl alcohol), polyethylene glycol, carboxymethyl cellulose, or a combination thereof. Also provided is a lithium battery comprising such an electrolyte.

17 Claims, 5 Drawing Sheets

(51) Int. Cl.
*H01M 4/525* (2010.01)
*H01M 4/583* (2010.01)
*H01M 4/66* (2006.01)
*H01M 10/0525* (2010.01)
*H01M 10/0562* (2010.01)
*H01M 10/0567* (2010.01)
*H01M 10/0569* (2010.01)

(56) References Cited

OTHER PUBLICATIONS

Hu et al., Lithium Ion Battery Flame Retardant Material and Preparation Method Thereof, Lithium Ion Battery Anode, Cathode, Diaphragm, Lithium Ion Battery and Battery Module, Nov. 2020, See the Abstract. (Year: 2020).*

Yamaguchi et al., Feb. 2004, Electrolyte Film/Electrode Junction, Fuel Cell, and Manufacturing Method of Electrolyte Film/Electrode Junction, See the Abstract. (Year: 2004).*

* cited by examiner

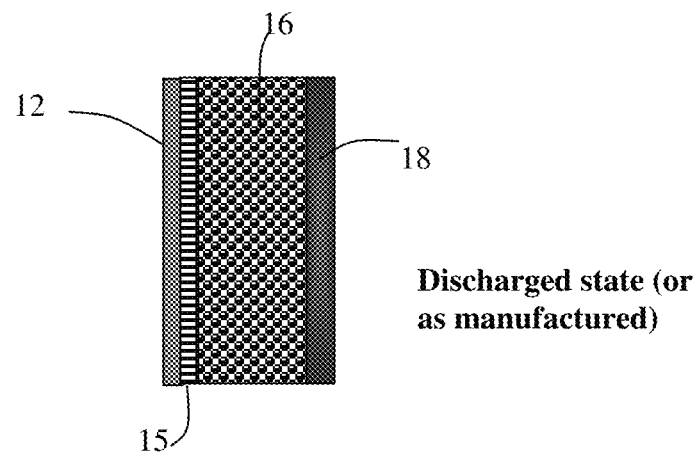
FIG. 2(A) Discharged state (or as manufactured)
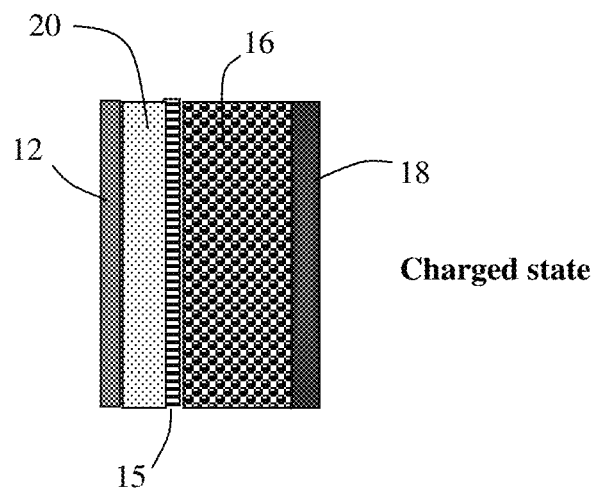
FIG. 2(B) Charged state

FLAME-RESISTANT QUASI-SOLID ELECTROLYTE FOR LITHIUM-ION AND LITHIUM METAL BATTERIES AND PRODUCTION METHOD

FIELD

The present disclosure provides a fire-resistant electrolyte and a lithium battery (lithium-ion and lithium metal batteries) containing such an electrolyte.

BACKGROUND

Rechargeable lithium-ion (Li-ion) and lithium metal batteries (e.g., lithium-sulfur, lithium selenium, and Li metal-air batteries) are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than lithium-ion batteries (having a graphite anode).

However, the electrolytes used for lithium-ion batteries and all lithium metal secondary batteries pose some safety concerns. Most of the organic liquid electrolytes can cause thermal runaway or explosion problems.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C." A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature.

Although ILs were suggested as a potential electrolyte for rechargeable lithium batteries due to their non-flammability, conventional ionic liquid compositions have not exhibited satisfactory performance when used as an electrolyte likely due to several inherent drawbacks: (a) ILs have relatively high viscosity at room or lower temperatures; thus being considered as not amenable to lithium ion transport; (b) For Li—S cell uses, ILs are capable of dissolving lithium polysulfides at the cathode and allowing the dissolved species to migrate to the anode (i.e., the shuttle effect remains severe); and (c) For lithium metal secondary cells, most of the ILs strongly react with lithium metal at the anode, continuing to consume Li and deplete the electrolyte itself during repeated charges and discharges. These factors lead to relatively poor specific capacity (particularly under high current or high charge/discharge rate conditions, hence lower power density), low specific energy density, rapid capacity decay and poor cycle life. Furthermore, ILs remain extremely expensive. Consequently, as of today, no commercially available lithium battery makes use of an ionic liquid as the primary electrolyte component.

Solid state electrolytes are commonly believed to be safe in terms of fire and explosion proof. Solid state electrolytes can be divided into organic, inorganic, organic-inorganic composite electrolytes. However, the conductivity of organic polymer solid state electrolytes, such as poly(ethylene oxide) (PEO), polypropylene oxide (PPO), poly(ethylene glycol) (PEG), and poly(acrylonitrile) (PAN), is typically low ($<10^{-5}$ S/cm).

Although the inorganic solid-state electrolyte (e.g. garnet-type and metal sulfide-type) can exhibit a high conductivity (about $10^{-3}$ S/cm), the interfacial impedance or resistance between the inorganic solid state electrolyte and the electrode (cathode or anode) is high. Further, the traditional inorganic ceramic electrolyte is very brittle and has poor film-forming ability and poor mechanical properties. These materials cannot be cost-effectively manufactured. Although an organic-inorganic composite electrolyte can lead to a reduced interfacial resistance, the lithium ion conductivity and working voltages may be decreased due to the addition of the organic polymer.

The applicant's research group has previously developed the quasi-solid state electrolytes (QSSE), which may be considered as a fourth type of solid state electrolyte. In certain variants of the quasi-solid state electrolytes, a small amount of liquid electrolyte may be present to help improving the physical and ionic contact between the electrolyte and the electrode, thus reducing the interfacial resistance. Examples of QSSEs are disclosed in the following: Hui He, et al. "Lithium Secondary Batteries Containing a Non-flammable Quasi-solid. Electrolyte," U.S. patent application Ser. No. 13/986,814 (Jun. 10, 2013); U.S. Pat. No. 9,368,831 (Jun. 14, 2016); U.S. Pat. No. 9,601,803 (Mar. 21, 2017); U.S. Pat. No. 9,601,805 (Mar. 21, 2017); U.S. Pat. No. 9,059,481 (Jun. 16, 2015).

However, the presence of certain liquid electrolytes may cause some problems, such as liquid leakage, gassing, and low resistance to high temperature. Therefore, a novel electrolyte system that obviates all or most of these issues is needed.

Hence, a general object of the present disclosure is to provide a safe, flame/fire-resistant, quasi-solid electrolyte system for a rechargeable lithium cell that is compatible with existing battery production facilities.

SUMMARY

The present disclosure provides an electrolyte, comprising: (a) a polymer, which is a polymerization or crosslinking product of a reactive additive, wherein the reactive additive comprises at least one reactive polymer, reactive oligomer, or reactive monomer and a curing agent or initiator and wherein the reactive polymer, oligomer, or monomer comprises at least a reactive carboxylic and/or a hydroxyl group; (b) a lithium salt; and (c) an organic liquid solvent or ionic liquid solvent.

Typically and desirably, such an electrolyte exhibits a vapor pressure less than 0.01 kPa when measured at 20° C., a vapor pressure less than 60% of the vapor pressure of the organic liquid solvent alone, a flash point at least 20 degrees Celsius higher than a flash point of the organic liquid solvent alone, a flash point higher than 150° C., or no measurable flash point. Typically, the polymer-to-solvent weight ratio is from 0.01/100 to 30/100 and more typically from 1/100 to 10/100. A higher polymer content leads to a significantly reduced vapor pressure and increased flash point or completely eliminated flash point (un-detectable).

In certain embodiments, the polymer comprises a high-elasticity polymer having a lithium ion conductivity from $10^{-8}$ S/cm to $5\times10^{-2}$ S/cm at room temperature, and a fully recoverable tensile elastic strain from 2% to 1,500% (typically from 5% to 800% and more typically from 10% to 500%) when measured without any filler or additive dispersed therein and wherein the high-elasticity polymer comprises at least a crosslinked polymer network of chains from at least one polymer containing carboxylic and/or hydroxyl groups.

In certain embodiments, the polymer in the electrolyte comprises a cross-linked network of chains from poly(acrylic acid), poly(vinyl alcohol), polyethylene glycol, carboxymethyl cellulose, or a combination thereof.

In some embodiments, the polymer comprises at least one, but preferably at least two compounds selected from poly(acrylic acid), poly(vinyl alcohol), carboxymethyl cellulose, citric acid, glycerol, a derivative of carboxymethyl cellulose, a derivative of poly(vinyl alcohol), a derivative of poly(acrylic acid), a carboxymethyl cellulose or poly(acrylic acid) substituted with an alkali cation, or a combination thereof, wherein the alkali cation is selected from $Li^+$, $Na^+$, $K^+$, $NH_4^+$, or a combination thereof.

Preferably, the reactive polymer, reactive oligomer, or reactive monomer comprises a chemical species selected from acrylic acid, poly(acrylic acid), a derivative of poly(acrylic acid), vinyl alcohol, poly(vinyl alcohol), a derivative of poly(vinyl alcohol), carboxymethyl cellulose, citric acid, glycerol, a derivative of carboxymethyl cellulose, a carboxymethyl cellulose or poly(acrylic acid) substituted with an alkali cation, or a combination thereof, wherein the alkali cation is selected from $Li^+$, $Na^+$, $K^+$, $NH_4^+$, or a combination thereof. A particularly desirable polymer in the electrolyte comprises a crosslinked polymer network of chains from carboxymethyl cellulose (CMC), a substituted version thereof, or a derivative thereof.

In certain embodiments, the polymer in the electrolyte comprises a cross-linked network of carboxymethyl cellulose, vinyl alcohol, or acrylic acid that is crosslinked by a crosslinking agent to a degree of crosslinking that imparts an elastic tensile strain from 5% to 500%.

The crosslinking agent may be selected from N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid, acrylic acid, methacrylic acid, a derivative compound of acrylic acid, a derivative compound of methacrylic acid, glycidyl functions, N,N-Methylenebisacrylamide (MBAAm), Ethylene glycol dimethacrylate (EGDMAAm), isobornyl methacrylate, poly(acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate, an urethane chain, a chemical derivative thereof, or a combination thereof.

The electrolyte may further comprise a flame-retardant additive, different in composition than the liquid solvent and forming a mixture with the liquid solvent, and the flame-retardant additive is selected from Hydrofluoroether (HFE), Trifluoro propylene carbonate (FPC), Methyl nonafluorobutyl ether (MFE), Fluoroethylene carbonate (FEC), Tris(trimethylsilyl)phosphite (TTSPi), Triallyl phosphate (TAP), Ethylene sulfate (DTD), 1,3-propane sultone (PS), Propene sultone (PES), Alkylsiloxane (Si—O), Alkyylsilane (Si—C), liquid oligomeric silaxane (—Si—O—Si—), Ttetraethylene glycol dimethylether (TEGDME), canola oil, or a combination thereof and the flame-retardant additive-to-said liquid solvent ratio in said mixture is from 5/95 to 95/5 by weight.

In some embodiments, the electrolyte further comprises a flame-retardant additive selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

In the electrolyte, the flame retardant additive may be in a form of encapsulated particles comprising the additive encapsulated by a shell of a substantially lithium ion-impermeable and liquid electrolyte-impermeable coating material, wherein said shell is breakable when exposed to a temperature higher than a threshold temperature.

The flame retardant additive-to-liquid solvent ratio in the mixture is from 1/95 to 99/1 by weight, preferably from 10/85 to 90/10 by weight, further preferably from 20/80 to 70/20 by weight, and most preferably from 35/65 to 65/35 by weight.

The polymer in the electrolyte may form a mixture, copolymer, semi-interpenetrating network, or simultaneous interpenetrating network with a second polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

In certain desirable embodiments, the electrolyte further comprises particles of an inorganic solid electrolyte material having a particle size from 2 nm to 30 μm, wherein the particles of inorganic solid electrolyte material are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

The present disclosure further provides a rechargeable lithium battery, including a lithium metal secondary cell, a lithium-ion cell, a lithium-sulfur cell, a lithium-ion sulfur cell, a lithium-selenium cell, or a lithium-air cell. This battery features a non-flammable, safe, and high-performing electrolyte as herein disclosed.

The polymer in the electrolyte composition preferably contains a reactive polymer that can be cured or cross-linked. This polymer may be initially in a monomer or oligomer state that remains as a liquid which can be injected into the battery cell and then polymerized and/or cured or crosslinked after being injected into a dry battery cell.

Alternatively, the reactive polymer, oligomer, or monomer (along with the needed initiator and/or crosslinking agent) may be mixed with an electrode active material (e.g. cathode active material particles, such as NCM, NCA and lithium iron phosphate), a conducting additive (e.g. carbon black, carbon nanotubes, expanded graphite flakes, or graphene sheets), and an optional flame-retardant agent and/or optional particles of an inorganic solid electrolyte to form a reactive slurry or paste. The slurry or paste is then made into a desired electrode shape (e.g. cathode electrode), possibly supported on a surface of a current collector (e.g. an Al foil as a cathode current collector). An anode of a lithium-ion cell may be made in a similar manner using an anode active material (e.g. particles of graphite, Si, SiO, etc.). The anode electrode, a cathode electrode, and an optional separator are then combined to form a battery cell. The reactive polymer, oligomer, or monomer inside the cell is then polymerized and/or crosslinked in situ inside the battery cell.

The organic liquid solvent in the disclosed electrolyte may be selected from the group consisting of 1,3-dioxolane (DOL), 1,2-dimethoxyethane (DME), tetraethylene glycol dimethylether (TEGDME), poly(ethylene glycol)dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, and combinations thereof.

The lithium salt in the electrolyte may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium (LiN($CF_3SO_2$)$_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The concentration of lithium salt dissolved in the organic liquid solvent or ionic liquid is preferably higher than 1.5 M and more preferably higher than 2.0 M (up to 14 M) when calculated without the polymer. The molar fraction or molecular fraction of the lithium salt in the organic liquid solvent or ionic liquid is preferably greater than 0.2 and up to 0.99.

The ionic liquid in the disclosed electrolyte maybe selected from a room temperature ionic liquid having a cation selected from tetraalkylammonium, di-, tri-, or tetraalkylimidazolium, alkylpyridinium, dialkyl-pyrrolidinium, dialkylpiperidinium, tetraalkylphosphonium, trialkylsulfonium, or a combination thereof.

The ionic liquid may be selected from a room temperature ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n—$C_4F_9BF_3^-$, $PF_6^-$, $CF_3CO_2$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

The electrolyte composition is designed to permeate into the internal structure of the cathode and to be in physical contact or ionic contact with the cathode active material in the cathode, and to permeate into the anode cathode to be in physical contact or ionic contact with the anode active material where/if present.

In general, such a quasi-solid electrolyte exhibits a vapor pressure less than 0.01 kPa (when measured at 20° C.) and less than 0.1 kPa (when measured at 100° C.) when the polymer is not present or not cured. In many cases, the vapor molecules are practically too few to be detected. The high solubility of the lithium salt in an otherwise highly volatile solvent, along with the presence of a polymer, has effectively prevented the flammable gas molecules from initiating a flame even at an extremely high temperature. The flash point of the quasi-solid electrolyte is typically at least 20 degrees (often >50 degrees) higher than the flash point of the same neat organic liquid solvent alone. In most of the cases, either the flash point is higher than 150° C. or no flash point can be detected. The electrolyte just would not catch on fire or get ignited. Any accidentally initiated flame does not sustain for longer than a few seconds. This is a highly significant discovery, considering the notion that fire and explosion concern has been a major impediment to widespread acceptance of battery-powered electric vehicles. This new technology could potentially reshape the landscape of EV industry.

The polymer in the disclosed electrolyte is designed to further reduce the flammability of the battery cell. In the presently disclosed lithium secondary cell, the mixture of a reactive monomer, oligomer or polymer and a curing (cross-linking) agent and/or initiator can be incorporated into the anode and/or cathode electrode separately, or into the entire battery cell at the same time. In other words, the reactive mixture may be introduced into the cathode and anode, respectively, before the cathode, the anode, and the porous separator (or ion-permeable membrane) are assembled into a cell. Curing of the reactive mass may be conducted before or after the cell assembly step.

Alternatively, the anode, the cathode, and the porous separator (or ion-permeable membrane) are assembled into a dry cell, which is then injected with the reactive mixture. The reactive mixture is subsequently cured by exposing the cell to a desired curing temperature or high energy radiation. As indicated earlier, the polymer in the electrolyte may be initially in a monomer or oligomer state that remains as a liquid which is capable of being injected and flowed into the battery cell and then cured or crosslinked after being injected into the cell. A long-chain polymer typically will not permeate into the interior of the cathode.

Still another preferred embodiment of the present disclosure is a rechargeable lithium-sulfur cell or lithium-ion sulfur cell containing a sulfur cathode having sulfur or lithium polysulfide as a cathode active material.

For a lithium metal cell (where lithium metal is the primary active anode material), the anode current collector may comprise a foil, perforated sheet, or foam of a metal having two primary surfaces wherein at least one primary surface is coated with or protected by a layer of lithiophilic metal (a metal capable of forming a metal-Li solid solution or is wettable by lithium ions), a layer of graphene material, or both. The metal foil, perforated sheet, or foam is preferably selected from Cu, Ni, stainless steel, Al, graphene-coated metal, graphite-coated metal, carbon-coated metal, or a combination thereof.

The lithiophilic metal is preferably selected from Au, Ag, Mg, Zn, Ti, K, Al, Fe, Mn, Co, Ni, Sn, V, Cr, an alloy thereof, or a combination thereof.

The graphene layer preferably comprises graphene sheets selected from single-layer or few-layer graphene, wherein said few-layer graphene sheets have 2-10 layers of stacked graphene planes having an inter-plane spacing $d_{002}$ from 0.3354 nm to 0.6 nm as measured by X-ray diffraction and said single-layer or few-layer graphene sheets contain a pristine graphene material having essentially zero % of non-carbon elements, or a non-pristine graphene material having 0.001% to 45% by weight of non-carbon elements. The non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof. The graphene layer may comprise porous graphene balls or graphene foam.

For a lithium ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

In some embodiments, the anode active material contains a prelithiated Si, prelithiated Ge, prelithiated Sn, prelithiated $SnO_x$, prelithiated $SiO_x$, prelithiated iron oxide, prelithiated $V_2O_5$, prelithiated $V_3O_8$, prelithiated $Co_3O_4$, prelithiated $Ni_3O_4$, or a combination thereof, wherein x=1 to 2.

The separator may comprise the presently disclosed electrolyte. In certain embodiments, the separator comprises polymeric fibers, ceramic fibers, glass fibers, or a combination thereof. These fibers may be stacked together in such a manner that there are pores that allow for permeation of lithium ions, but not for penetration of any potentially formed lithium dendrites. These fibers may be dispersed in a matrix material or bonded by a binder material. This matrix or binder material may contain a ceramic or glass material. The polymer electrolyte may serve as the matrix material or binder material that helps to hold these fibers together. The separator may contain particles of a glass or ceramic material (e.g. metal oxide, metal carbide, metal nitride, metal boride, etc.).

The rechargeable lithium cell may further comprise a cathode current collector selected from aluminum foil, carbon- or graphene-coated aluminum foil, stainless steel foil or web, carbon- or graphene-coated steel foil or web, carbon or graphite paper, carbon or graphite fiber fabric, flexible graphite foil, graphene paper or film, or a combination thereof. A web means a screen-like structure or a metal foam, preferably having interconnected pores or through-thickness apertures.

The presently disclosed lithium cell is not limited to lithium metal-sulfur cell or lithium-ion cell. This safe and high-performing hybrid electrolyte can be used in any lithium metal secondary cell (lithium metal-based anode coupled with any cathode active material) and any lithium-ion cell.

The present disclosure also provides an electrolyte composition comprising:
a) a first solution, comprising a reactive additive and a first organic solvent, wherein the reactive additive comprises at least one reactive polymer, reactive oligomer, or reactive monomer and wherein the reactive polymer, oligomer, or monomer comprises at least a reactive carboxylic and/or a hydroxyl group; and
b) a second solution, comprising an initiator or crosslinking agent, a lithium salt, and a second organic solvent, wherein the first solution and the second solution are stored separately before the first solution and the second solution are mixed to form the electrolyte composition.

In the electrolyte composition, the reactive polymer, reactive oligomer, or reactive monomer preferably comprises a chemical species selected from acrylic acid, poly(acrylic acid), a derivative of poly(acrylic acid), vinyl alcohol, poly(vinyl alcohol), a derivative of poly(vinyl alcohol), carboxymethyl cellulose, citric acid, glycerol, a derivative of carboxymethyl cellulose, a carboxymethyl cellulose or poly(acrylic acid) substituted with an alkali cation, or a combination thereof, wherein the alkali cation is selected from $Li^+$, $Na^+$, $K^+$, $NH_4^+$, or a combination thereof.

In certain embodiments, the first solution or the second solution further comprises a flame-retardant additive. The flame-retardant additive may be selected from Hydrofluro ether (FIFE). Trifluoro propylene carbonate (FPC), Methyl nonafluorobutyl ether (MFE), Fluoroethylene carbonate (FEC), Tris(trimethylsilyl)phosphite (TTSPi), Triallyl phosphate (TAP), Ethylene sulfate (DTD), 1,3-propane sultone (PS), Propene sultone (PES), Alkylsiloxane (Si—O), Alkyylsilane (Si—C), liquid oligomeric silaxane (—Si—O—Si—), Ttetraethylene glycol dimethylether (TEGDME), canola oil, or a combination thereof.

In some embodiments, the flame-retardant additive is selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

The disclosure also provides a method of producing the disclosed rechargeable lithium cell, the method comprising: (A) mixing particles of a cathode active material, an optional conductive additive (typically required in the cathode), an optional binder (not required since, upon polymerization and/or crosslinking, the reactive additive becomes a binder that bonds the solid particles in the electrode together), a reactive additive, a non-aqueous liquid solvent, and a lithium salt to form a cathode, wherein the reactive additive comprises at least one reactive polymer, reactive oligomer, or reactive monomer and a curing agent or initiator and wherein the reactive polymer, oligomer, or monomer comprises at least a reactive carboxylic and/or a hydroxyl group; (B) providing an anode; (C) combining the cathode and the anode to form a cell; and (D) polymerizing and/or crosslinking the reactive additive, prior to or after step (C), to produce the rechargeable lithium cell.

In certain embodiments, step (B) comprises a procedure of mixing particles of an anode active material, an optional conductive additive (not required if the anode active material is a carbon or graphite material), an optional binder (not required since, upon polymerization and/or crosslinking, the reactive additive becomes a binder that bonds the solid particles in the electrode together), a reactive additive (the same or different reactive as used in the cathode), a non-aqueous liquid solvent, and a lithium salt to form an anode and the method further comprises polymerizing and/or crosslinking the reactive additive, prior to or after step (C), to produce the rechargeable lithium cell.

In some embodiments, step (A) further comprises adding particles of an inorganic solid electrolyte powder and/or a flame retardant additive in the cathode. Step (B) may further comprise adding particles of an inorganic solid electrolyte powder and/or a flame retardant additive in the anode.

The disclosure further provides a method of producing a rechargeable lithium cell, the method comprising: (a) providing a cathode; (b) providing an anode; (c) combining the cathode and the anode to form a dry cell; and (d) introducing the presently disclosed electrolyte composition into the dry cell and polymerizing and/or crosslinking the reactive additive to produce the rechargeable lithium cell. Step (c) may entail combining the anode, a porous separator, the cathode, along with their respective current collectors, to form a unit cell which is enclosed in a protective housing to form a dry cell.

The present disclosure provides yet another method of producing the disclosed rechargeable lithium cell, the method comprising: (A) mixing particles of a cathode active material, an optional conductive additive (typically required in the cathode), an optional binder (not required since the reactive additive becomes a binder upon polymerization and/or crosslinking), optional particles of an inorganic solid electrolyte powder, an optional flame-retardant agent, and a reactive additive to form a cathode, wherein the reactive additive comprises at least one reactive polymer, reactive oligomer, or reactive monomer and wherein the reactive polymer, oligomer, or monomer comprises at least a reactive carboxylic and/or a hydroxyl group; (B) providing an anode; (C) combining the cathode, an optional separator, the anode, and a protective housing to form a cell; and (D) injecting a liquid mixture of a lithium salt, a non-aqueous liquid solvent, and an initiator and/or curing agent into the cell and polymerizing and/or crosslinking the reactive additive to produce the rechargeable lithium cell.

The procedure of polymerizing and/or crosslinking may comprise exposing the reactive additive to heat, high-energy radiation, or a combination thereof.

These and other advantages and features of the present disclosure will become more transparent with the description of the following best mode practice and illustrative examples.

BRIEF DESCRIPTION OF THE DRAWINGS

FIG. 2(A) Structure of an anode-less lithium metal cell (as manufactured or in a discharged state) according to some embodiments of the present disclosure;

FIG. 2(B) Structure of an anode-less lithium metal cell (in a charged state) according to some embodiments of the present disclosure.

DETAILED DESCRIPTION OF PREFERRED EMBODIMENTS

Figure 1A:
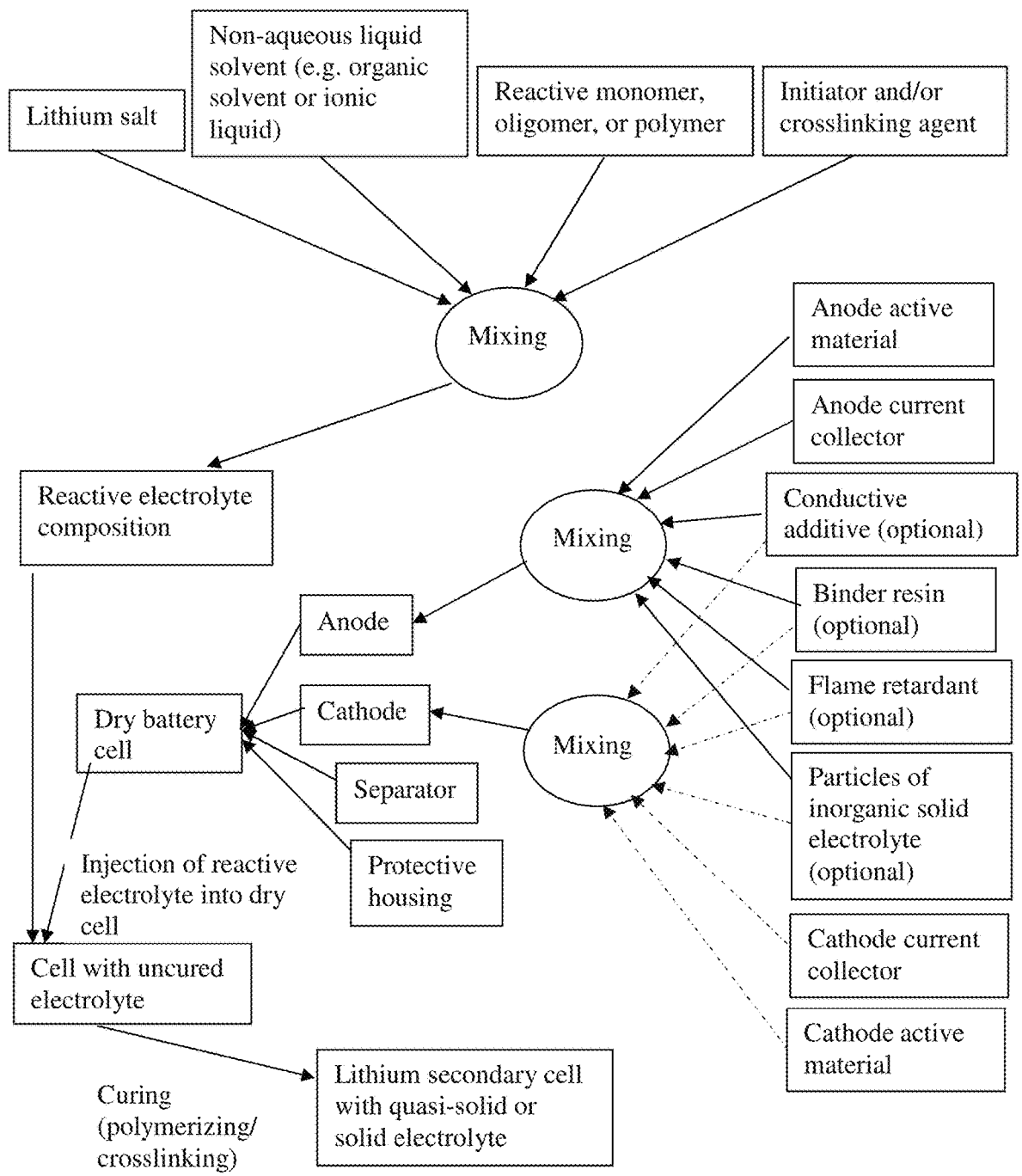
FIG. 1(A) A process flow chart to illustrate a method of producing a lithium metal battery comprising a substantially solid-state electrolyte according to some embodiments of the present disclosure.

The present disclosure provides a safe and high-performing lithium battery, which can be any of various types of lithium-ion cells or lithium metal cells. A high degree of safety is imparted to this battery by a novel and unique electrolyte that is highly flame-resistant and would not initiate a fire or sustain a fire and, hence, would not pose explosion danger. This disclosure has solved the very most critical issue that has plagued the lithium-metal and lithium-ion industries for more than two decades.

As indicated earlier in the Background section, a strong need exists for a safe, non-flammable, yet injectable quasi-solid electrolyte (or practically solid-state electrolyte) system for a rechargeable lithium cell that is compatible with existing battery production facilities. It is well-known in the art that solid-state electrolyte battery typically cannot be produced using existing lithium-ion battery production equipment or processes.

The present disclosure provides an electrolyte, comprising: (a) a polymer, which is a polymerization or crosslinking product of a reactive additive, wherein the reactive additive comprises at least one reactive polymer, reactive oligomer, or reactive monomer and a curing agent or initiator and wherein the reactive polymer, oligomer, or monomer comprises at least a reactive carboxylic and/or a hydroxyl group; (b) a lithium salt; and (c) an organic liquid solvent or ionic liquid solvent. Upon polymerization and/or crosslinking, the electrolyte is a quasi-solid or substantially solid-state electrolyte that has the following highly desirable and advantageous features: (i) good electrolyte-electrode contact and interfacial stability (minimal solid electrode-electrolyte interfacial impedance) commonly enjoyed by a liquid electrolyte; (ii) good processibility and ease of battery cell production; (iii) highly resistant to flame and fire.

The polymer preferably comprises a high-elasticity polymer having a lithium ion conductivity from $10^{-8}$ S/cm to $5\times10^{-2}$ S/cm at room temperature, and a fully recoverable tensile elastic strain from 2% to 1,500% when measured without any additive dispersed therein and wherein the high-elasticity polymer comprises at least a crosslinked polymer network of chains from at least one polymer containing carboxylic and/or hydroxyl groups. Such a highly elastic polymer enables excellent contact between different layers, such as an anode layer, a separator, and a cathode layer, in a lithium battery, thereby reducing interfacial impedance.

In certain embodiments, the rechargeable lithium cell comprises:

(a) a cathode having a cathode active material (along with an optional conductive additive and an optional resin binder) and an optional cathode current collector (such as Al foil) supporting the cathode active material;

(b) an anode having an anode current collector, with or without an anode active material; (It may be noted that if no conventional anode active material, such as graphite, Si, SiO, Sn, and conversion-type anode materials, and no lithium metal is present in the cell when the cell is made and before the cell begins to charge and discharge, the battery cell is commonly referred to as an "anode-less" cell.)

(c) an optional porous separator (a lithium ion-permeable membrane) electronically separating the anode and the cathode; and (d) an electrolyte, described above, comprising (i) a polymer, which is a polymerization or crosslinking product of a reactive additive, wherein the reactive additive comprises at least one reactive polymer, reactive oligomer, or reactive monomer and a curing agent or initiator and wherein the reactive polymer, oligomer, or monomer comprises at least a reactive carboxylic and/or a hydroxyl group; (ii) a lithium salt; and (iii) an organic liquid solvent or ionic liquid solvent. This polymer, without any additive dispersed therein is highly elastic and has a good lithium ion conductivity.

In certain embodiments, the polymer in the electrolyte comprises a cross-linked network of chains from poly(acrylic acid), poly(vinyl alcohol), polyethylene glycol, carboxymethyl cellulose, or a combination thereof. In some embodiments, the polymer comprises at least one, but preferably at least two compounds selected from poly(acrylic acid), poly(vinyl alcohol), carboxymethyl cellulose, citric acid, glycerol, a derivative of carboxymethyl cellulose, a derivative of poly(vinyl alcohol), a derivative of poly(acrylic acid), a carboxymethyl cellulose or poly(acrylic acid) substituted with an alkali cation, or a combination thereof, wherein the alkali cation is selected from $Li^+$, $Na^+$, $K^+$, $NH_4^+$, or a combination thereof.

Preferably, the reactive polymer, reactive oligomer, or reactive monomer comprises a chemical species selected from acrylic acid, poly(acrylic acid), a derivative of poly(acrylic acid), vinyl alcohol, poly(vinyl alcohol), a derivative of poly(vinyl alcohol), carboxymethyl cellulose, citric acid, glycerol, a derivative of carboxymethyl cellulose, a carboxymethyl cellulose or poly(acrylic acid) substituted with an alkali cation, or a combination thereof, wherein the alkali cation is selected from $Li^+$, $Na^+$, $K^+$, $NH_4^+$, or a combination thereof. A particularly desirable polymer in the electrolyte comprises a crosslinked polymer network of chains from carboxymethyl cellulose (CMC), a substituted version thereof, or a derivative thereof.

In certain embodiments, the polymer in the electrolyte comprises a cross-linked network of carboxymethyl cellulose, vinyl alcohol, or acrylic acid that is crosslinked by a crosslinking agent to a degree of crosslinking that imparts an elastic tensile strain from 5% to 500%.

In certain desired embodiments, the polymer contains a cross-linked network of polymer chains. This high-elasticity polymer has a carboxylic group (—COOH), a hydroxyl group (—OH), a derivative thereof, or a combination thereof. For example, the high-elasticity polymer comprises a cross-linked network of poly(acrylic acid) (PAA, Chemical formula 1) and poly(vinyl alcohol) (PVA, Chemical formula 2) chains. The PAA polymer, oligomer (low-molecular weight polymer), or monomer bears one or multiple —COOH groups prior to being polymerized or crosslinked.

(Chemical formula 1: PAA)

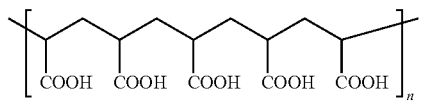

(Chemical formula 2: PVA)

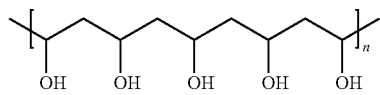

At a temperature of typically from 100° C. to 200° C., PAA and PVA chains can react to form a crosslinked polymer network, typically through the etherification between the carboxylic functional group (—COOH) of PAA and the hydroxyl functional group (—OH) of PVA.

The polymer may be obtained from a wide variety of polymer chains, oligomers, or monomers having a carboxylic functional group (—COOH or a derivative thereof). Examples of the high-elasticity polymer can include at least two compounds selected from poly(acrylic acid), poly(vinyl alcohol), citric acid, glycerol, CMC, a derivative of poly(vinyl alcohol), a derivative of poly(acrylic acid), poly(acrylic acid) substituted with an alkali cation, or a combination thereof, wherein the alkali cation is selected from $Li^+$, $Na^+$, $K^+$, $NH_4^+$, or a combination thereof. These network or cross-linked polymers exhibit a unique combination of a high elasticity (high elastic deformation strain) and high lithium-ion conductivity.

In some embodiments, the polymer comprises a cross-linked polymer network of chains from carboxymethyl cellulose (CMC), a substituted version thereof, or a derivative thereof.

The high-elasticity polymer may comprise a cross-linked network of carboxymethyl cellulose crosslinked by a cross-linking agent to a degree of crosslinking that imparts an elastic tensile strain from 5% to 500%.

In certain desired embodiments, the polymer contains a cross-linked network of polymer chains from carboxymethyl cellulose. Carboxymethyl cellulose (CMC; Formula 3) is a water-soluble material and it is soluble in either hot or cold water. The CMC may have some of its —H substituted by an alkali ion, such as $Li^+$, $Na^+$, $K^+$, and $NH_4^+$).

(Chemical formula 3: CMC)

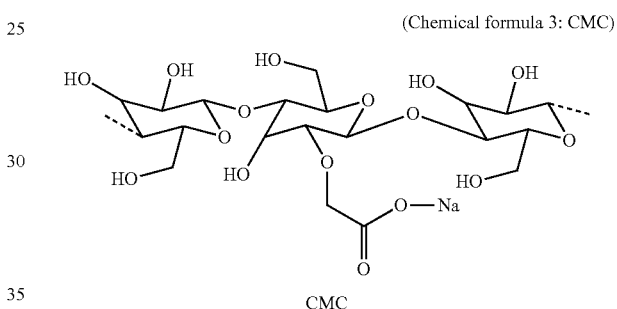

CMC

The crosslinking agent for CMC is preferably selected from N,N-methylene bisacrylamide, epichlorohydrin, 1,4-butanediol diglycidyl ether, tetrabutylarrimonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid (Formula 4 below), acrylic acid, methacrylic acid, a derivative compound of acrylic acid, a derivative compound of methacrylic acid (e.g. polyhydroxyethylmethacrylate), glycidyl functions, N,N'-Methylenebisacrylamide (MBAAm), Ethylene glycol dimethacrylate (EGDMAAm), isobornyl methacrylate, poly(acrylic acid) (PAA; Chemical Formula 1 and Formula 5), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate (e.g. methylene diphenyl diisocyanate, MDI), an urethane chain, a chemical derivative thereof, or a combination thereof.

(Chemical formula 4: citric acid)

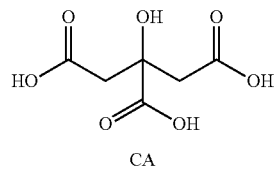

CA

-continued (Chemical formula 5: Na-substituted PAA)

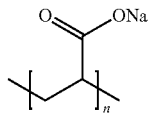

Particularly desirable crosslinking agents for CMC are acrylic acid and poly(acrylic acid) (PAA). At a temperature of typically from 50° C. to 200° C., PAA and CMC chains can react to form a crosslinked polymer network, typically through the etherification between the carboxylic functional group (—COOH) of PAA and the hydroxyl functional group (—OH) of CMC. Some of the —COOH groups in the PAA chain can form a strong covalent bond with the —OH group commonly found on surfaces of Si, a high-capacity anode active material. This implies that Si particles can be chemically bonded to the crosslinked polymer network.

For substituted CMC species, the —H groups in the CMC structure (Chemical formula 1) may be replaced by —R, where R is selected from a substituted or unsubstituted C1 to C10 alkyl group, an alkali metal, a substituted or unsubstituted C6 to C30 aryl group, or a substituted or unsubstituted C1 to C30 alkoxy group.

In certain desired embodiments, one can make use of a semi-interpenetrating polymer network (semi-IPN) as an elastic polymer matrix, wherein the semi-IPN includes CMC-derived chains and polymer chains from a repeating unit represented by Chemical Formula 6 or a repeating unit represented by Chemical Formula 7, wherein, $R^1$ and $R^2$ are the same or different and are independently selected from hydrogen, or a substituted or unsubstituted C1 to C10 alkyl group, and $R^3$ and $R^4$ are an alkali metal, and wherein, $R^5$ to $R^8$ are the same or different, and are independently hydrogen, a substituted or unsubstituted C1 to C30 alkyl group, a substituted or unsubstituted C6 to C30 aryl group, or a substituted or unsubstituted C1 to C30 alkoxy group.

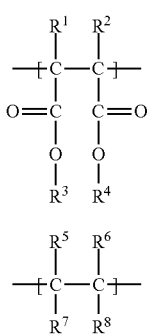

(Chemical Formula 6)

(Chemical Formula 7)

The electrolyte may further comprise a flame-retardant additive, different in composition than the liquid solvent and forming a mixture with the liquid solvent, and the flame-retardant additive is selected from Hydrofluoro ether (HFE), Trifluoro propylene carbonate (FPC), Methyl nonafluorobutyl ether (MFE), Fluoroethylene carbonate (FEC), Tris (trimethylsilyl)phosphite (TTSPi), Triallyl phosphate (TAP), Ethylene sulfate (DTD), 1,3-propane sultone (PS), Propene sultone (PES), Alkylsiloxane (Si—O), Alkyylsilane (Si—C), liquid oligomeric silaxane (—Si—O—Si—), Ttetraethylene glycol dimethylether (TEGDME), canola oil, or a combination thereof and the flame-retardant additive-to-said liquid solvent ratio in said mixture is from 5/95 to 95/5 by weight.

Flame-retardant additives are intended to inhibit or stop polymer pyrolysis and electrolyte combustion processes by interfering with the various mechanisms involved—heating, ignition, and propagation of thermal degradation.

The flame retardant additive may be selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

There is no limitation on the type of flame retardant that can be physically or chemically incorporated into the elastic polymer. The main families of flame retardants are based on compounds containing: Halogens (Bromine and Chlorine), Phosphorus, Nitrogen, Intumescent Systems, Minerals (based on aluminum and magnesium), and others (e.g. Borax, $Sb_2O_3$, and nanocomposites). Antimony trioxide is a good choice, but other forms of antimony such as the pentoxide and sodium antimonate may also be used.

One may use the reactive types (being chemically bonded to or becoming part of the polymer structure) and additive types (simply dispersed in the polymer matrix). For instance, reactive polysiloxane can chemically react with EPDM type elastic polymer and become part of the crosslinked network polymer. It may be noted that flame-retarding group modified polysiloxane itself is an elastic polymer composite containing a flame reatardant according to an embodiment of instant disclosure. Both reactive and additive types of flame retardants can be further separated into several different classes:

1) Minerals: Examples include aluminum hydroxide (ATH), magnesium hydroxide (MDH), huntite and hydromagnesite, various hydrates, red phosphorus and boron compounds (e.g. borates).
2) Organo-halogen compounds: This class includes organochlorines such as chlorendic acid derivatives and chlorinated paraffins; organobromines such as decabromodiphenyl ether (decaBDE), decabromodiphenyl ethane (a replacement for decaBDE), polymeric brominated compounds such as brominated polystyrenes, brominated carbonate oligomers (BCOs), brominated epoxy oligomers (BEOs), tetrabromophthalic anyhydride, tetrabromobisphenol A (TBBPA), and hexabromocyclododecane (HBCD).
3) Organophosphorus compounds: This class includes organophosphates such as triphenyl phosphate (TPP), resorcinol bis(diphenylphosphate) (RDP), bisphenol A diphenyl phosphate (BADP), and tricresyl phosphate (TCP); phosphonates such as dimethyl methylphosphonate (DMMP); and phosphinates such as aluminum diethyl phosphinate. In one important class of flame retardants, compounds contain both phosphorus and a halogen. Such compounds include tris(2,3-dibromopropyl)phosphate (brominated tris) and chlorinated organophosphates such as tris(1,3-dichloro-2-propyl) phosphate (chlorinated tris or TDCPP) and tetrakis(2-chlorethyl) dichloroisopentyldiphosphate (V6).
4) Organic compounds such as carboxylic acid and dicarboxylic acid The mineral flame retardants mainly act as additive flame retardants and do not become chemically attached to the surrounding system (the polymer). Most of the organohalogen and organophosphate compounds also do not react permanently to attach themselves into the polymer. Certain new non halogenated products, with reactive and non-emissive characteristics have been commercially available as well.

In certain embodiments, the flame retardant additive is in a form of encapsulated particles comprising the additive encapsulated by a shell of coating material that is breakable or meltable when exposed to a temperature higher than a threshold temperature (e.g., flame or fire temperature induced by internal shorting). The encapsulating material is a substantially lithium ion-impermeable and liquid electrolyte-impermeable coating material. The encapsulating or micro-droplet formation processes The flame retardant additive-to-liquid solvent ratio in the mixture is from 1/95 to 99/1 by weight, preferably from 10/85 to 90/10 by weight, further preferably from 20/80 to 70/20 by weight, and most preferably from 35/65 to 65/35 by weight.

The polymer in the electrolyte may form a mixture, copolymer, semi-interpenetrating network, or simultaneous interpenetrating network with a second polymer selected from poly(ethylene oxide), polypropylene oxide, poly(ethylene glycol), poly(acrylonitrile), poly(methyl methacrylate), poly(vinylidene fluoride), poly bis-methoxy ethoxy-ethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

In certain desirable embodiments, the electrolyte further comprises particles of an inorganic solid electrolyte material having a particle size from 2 nm to 30 µm, wherein the particles of inorganic solid electrolyte material are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

The inorganic solid electrolytes that can be incorporated into an elastic polymer protective layer include, but are not limited to, perovskite-type, NASICON-type, garnet-type and sulfide-type materials. A representative and well-known perovskite solid electrolyte is $Li_{3x}La_{2/3-x}TiO_3$, which exhibits a lithium-ion conductivity exceeding $10^{-3}$ S/cm at room temperature. This material has been deemed unsuitable in lithium batteries because of the reduction of $Ti^{4+}$ on contact with lithium metal. However, we have found that this material, when dispersed in an elastic polymer, does not suffer from this problem.

The sodium superionic conductor (NASICON)-type compounds include a well-known $NA_{1+x}Zr_2Si_xP_{3-x}O_{12}$. These materials generally have an $AM_2(PO_4)_3$ formula with the A site occupied by Li, Na or K. The M site is usually occupied by Ge, Zr or Ti. In particular, the $LiTi_2(PO_4)_3$ system has been widely studied as a solid state electrolyte for the lithium-ion battery. The ionic conductivity of $LiZr_2(PO_4)_3$ is very low, but can be improved by the substitution of Hf or Sn. This can be further enhanced with substitution to form $Li_{1+x}M_xTi_{2-x}(PO_4)_3$ (M=Al, Cr, Ga, Fe, Sc, In, Lu, Y or La). Al substitution has been demonstrated to be the most effective solid state electrolyte. The $Li_{1+x}Al_xGe_{2-x}(PO_4)_3$ system is also an effective solid state due to its relatively wide electrochemical stability window. NASICON-type materials are considered as suitable solid electrolytes for high-voltage solid electrolyte batteries.

Garnet-type materials have the general formula $A_3B_2Si_3O_{12}$, in which the A and B cations have eightfold and sixfold coordination, respectively. In addition to $Li_3M_2Ln_3O_{12}$ (M=W or Te), a broad series of garnet-type materials may be used as an additive, including $Li_5La_3M_2O_{12}$ (M=Nb or Ta), $Li_6ALa_2M_2O_{12}$ (A=Ca, Sr or Ba; M=Nb or Ta), $Li_{5.5}La_3M_{1.75}B_{0.25}O_{12}$ (M=Nb or Ta; B=In or Zr) and the cubic systems $Li_7La_3Zr_2O_{12}$ and $Li_{7.06}M_3Y_{0.06}Zr_{1.94}O_{12}$ (M=La, Nb or Ta). The $Li_{6.5}La_3Zr_{1.75}Te_{0.25}O_{12}$ compounds have a high ionic conductivity of $1.02 \times 10^{-3}$ S/cm at room temperature.

The sulfide-type solid electrolytes include the $Li_2S$—$SiS_2$ system. The highest reported conductivity in this type of material is $6.9 \times 10^{-4}$ S/cm, which was achieved by doping the $Li_2S$—$SiS_2$ system with $Li_3PO_4$. The sulfide type also includes a class of thio-LISICON (lithium superionic conductor) crystalline material represented by the $Li_2S$—$P_2S_5$ system. The chemical stability of the $Li_2S$—$P_2S_5$ system is considered as poor, and the material is sensitive to moisture (generating gaseous $H_2S$). The stability can be improved by the addition of metal oxides. The stability is also significantly improved if the $Li_2S$—$P_2S_5$ material is dispersed in an elastic polymer.

These solid electrolyte particles dispersed in an electrolyte polymer can help enhance the lithium ion conductivity of certain polymers having an intrinsically low ion conductivity.

Preferably and typically, the polymer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm.

The high-elasticity polymer should have a high elasticity (elastic deformation strain value >2%). An elastic deformation is a deformation that is fully recoverable and the recovery process is essentially instantaneous (no significant time delay). The high-elasticity polymer can exhibit an elastic deformation from 5% up to 1,000% (10 times of its original length), more typically from 10% to 800%, and further more typically from 50% to 500%, and most typically and desirably from 70% to 300%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

The disclosed lithium battery can be a lithium-ion battery or a lithium metal battery, the latter having lithium metal as the primary anode active material. The lithium metal battery can have lithium metal implemented at the anode when the cell is made. Alternatively, the lithium may be stored in the cathode active material and the anode side is lithium metal-free initially. This is called an anode-less lithium metal battery.

As illustrated in FIG. 2(A), the anode-less lithium cell is in an as-manufactured or fully discharged state according to certain embodiments of the present disclosure. The cell comprises an anode current collector 12 (e.g., Cu foil), a separator, a cathode layer 16 comprising a cathode active material, an optional conductive additive (not shown), an optional resin binder (not shown), and an electrolyte (dispersed in the entire cathode layer and in contact with the cathode active material), and a cathode current collector 18 that supports the cathode layer 16. There is no lithium metal in the anode side when the cell is manufactured.

In a charged state, as illustrated in FIG. 2(B), the cell comprises an anode current collector 12, lithium metal 20 plated on a surface (or two surfaces) of the anode current collector 12 (e.g., Cu foil), a separator 15, a cathode layer 16, and a cathode current collector 18 supporting the cathode layer. The lithium metal comes from the cathode active material (e.g., $LiCoO_2$ and $LiMn_2O_4$) that contains Li element when the cathode is made. During a charging step, lithium ions are released from the cathode active material and move to the anode side to deposit onto a surface or both surfaces of an anode current collector.

One unique feature of the presently disclosed anode-less lithium cell is the notion that there is substantially no anode active material and no lithium metal is present when the battery cell is made. The commonly used anode active material, such as an intercalation type anode material (e.g. graphite, carbon particles, Si, SiO, Sn, $SnO_2$, Ge, etc.), P, or any conversion-type anode material, is not included in the cell. The anode only contains a current collector or a protected current collector. No lithium metal (e.g. Li particle, surface-stabilized Li particle, Li foil, Li chip, etc.) is present in the anode when the cell is made; lithium is basically stored in the cathode (e.g. Li element in $LiCoO_2$, $LiMn_2O_4$, lithium iron phosphate, lithium polysulfides, lithium polyselenides, etc.). During the first charge procedure after the cell is sealed in a housing (e.g. a stainless steel hollow cylinder or an Al/plastic laminated envelop), lithium ions are released from these Li-containing compounds (cathode active materials) in the cathode, travel through the electrolyte/separator into the anode side, and get deposited on the surfaces of an anode current collector. During a subsequent discharge procedure, lithium ions leave these surfaces and travel back to the cathode, intercalating or inserting into the cathode active material.

Such an anode-less cell is much simpler and more cost-effective to produce since there is no need to have a layer of anode active material (e.g., graphite particles, along with a conductive additive and a binder) pre-coated on the Cu foil surfaces via the conventional slurry coating and drying procedures. The anode materials and anode active layer manufacturing costs can be saved. Furthermore, since there is no anode active material layer (otherwise typically 40-200 μm thick), the weight and volume of the cell can be significantly reduced, thereby increasing the gravimetric and volumetric energy density of the cell.

Another important advantage of the anode-less cell is the notion that there is no lithium metal in the anode when a lithium metal cell is made. Lithium metal (e.g. Li metal foil and particles) is highly sensitive to air moisture and oxygen and notoriously known for its difficulty and danger to handle during manufacturing of a Li metal cell. The manufacturing facilities must be equipped with special class of dry rooms, which are expensive and significantly increase the battery cell costs.

The anode current collector may be selected from a foil, perforated sheet, or foam of Cu, Ni, stainless steel, Al, graphene, graphite, graphene-coated metal, graphite-coated metal, carbon-coated metal, or a combination thereof. Preferably, the current collector is a Cu foil, Ni foil, stainless steel foil, graphene-coated Al foil, graphite-coated Al foil, or carbon-coated Al foil.

The anode current collector typically has two primary surfaces. Preferably, one or both of these primary surfaces is deposited with multiple particles or coating of a lithium-attracting metal (lithiophilic metal), wherein the lithium-attracting metal, preferably having a diameter or thickness from 1 nm to 10 μm, is selected from Au, Ag, Mg, Zn, Ti, K, Al, Fe, Mn, Co, Ni, Sn, V, Cr, an alloy thereof, or a combination thereof. This deposited metal layer may be further deposited with a layer of graphene that covers and protects the multiple particles or coating of the lithiophilic metal.

The graphene layer may comprise graphene sheets selected from single-layer or few-layer graphene, wherein the few-layer graphene sheets are commonly defined to have 2-10 layers of stacked graphene planes having an inter-plane spacing $d_{002}$ from 0.3354 nm to 0.6 nm as measured by X-ray diffraction. The single-layer or few-layer graphene sheets may contain a pristine graphene material having essentially zero % of non-carbon elements, or a non-pristine graphene material having 0.001% to 45% by weight of non-carbon elements. The non-pristine graphene may be selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

The graphene layer may comprise graphene balls and/or graphene foam. Preferably, the graphene layer has a thickness from 1 nm to 50 μm and/or has a specific surface area from 5 to 1000 $m^2/g$ (more preferably from 10 to 500 $m^2/g$).

For a lithium-ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

Another surprising and of tremendous scientific and technological significance is our discovery that the flammability of any volatile organic solvent can be effectively suppressed provided that a sufficiently high amount of a lithium salt and polymer is added to and dissolved in this organic solvent to form a solid-like or quasi-solid electrolyte (e.g. first electrolyte in the cathode). In general, such a quasi-solid electrolyte exhibits a vapor pressure less than 0.01 kPa and often less than 0.001 kPa (when measured at 20° C.) and less than 0.1 kPa and often less than 0.01 kPa (when measured at 100° C.). (The vapor pressures of the corresponding neat solvent, without any lithium salt dissolved therein, are typically significantly higher.) In many cases, the vapor molecules are practically too few to be detected.

A highly significant observation is that the high concentration of the lithium salt dissolved in an otherwise highly volatile solvent (a large molecular ratio or molar fraction of lithium salt, typically >0.2, more typically >0.3, and often >0.4 or even >0.5) can dramatically curtail the amount of volatile solvent molecules that can escape into the vapor phase in a thermodynamic equilibrium condition. In many cases, this has effectively prevented the flammable gas molecules from initiating a flame even at an extremely high temperature. The flash point of the quasi-solid electrolyte is typically at least 20 degrees (often >50 degrees) higher than the flash point of the neat organic solvent alone. In most of the cases, either the flash point is higher than 150° C. or no flash point can be detected. The electrolyte just would not catch on fire. Furthermore, any accidentally initiated flame does not sustain for longer than 3 seconds. This is a highly significant discovery, considering the notion that fire and explosion concern has been a major impediment to widespread acceptance of battery-powered electric vehicles. This new technology could significantly impact the emergence of a vibrant EV industry.

The polymer electrolyte composition preferably contains a polymer that can be cured or cross-linked. This polymer may be initially in a monomer or oligomer state that remains as a liquid which can be injected into the battery cell and then cured or crosslinked after being injected into the cell.

In addition to the non-flammability and high lithium ion transference numbers, there are several additional benefits associated with using the presently disclosed quasi-solid electrolytes. As one example, the quasi-solid electrolyte can significantly enhance cyclic and safety performance of rechargeable lithium batteries through effective suppression of lithium dendrite growth. Due to a high lithium ion concentration and a high lithium-ion transference number, the quasi-solid electrolyte provides a large amount of available lithium-ion flux and raises the lithium ionic mass transfer rate between the electrolyte and the lithium electrode, thereby enhancing the lithium deposition uniformity and dissolution during charge/discharge processes.

Additionally, the local high viscosity induced by a high concentration and the presence of a crosslinked network can increase the pressure from the electrolyte to inhibit dendrite growth, potentially resulting in a more uniform deposition on the surface of the anode. The high viscosity could also limit anion convection near the deposition area, promoting more uniform deposition of Li ions. These reasons, separately or in combination, are believed to be responsible for the notion that no dendrite-like feature has been observed with any of the large number of rechargeable lithium cells that we have investigated thus far.

As another benefit example, this electrolyte is capable of inhibiting lithium polysulfide dissolution at the cathode and migration to the anode of a Li—S cell, thus overcoming the polysulfide shuttle phenomenon and allowing the cell capacity not to decay significantly with time. Consequently, a coulombic efficiency nearing 100% along with long cycle life can be achieved. When a concentrated electrolyte and a crosslinked polymer is used, the solubility of lithium polysulfide will be reduced significantly.

The liquid solvent utilized in the instant electrolytes may be selected from the group consisting of 1,3-dioxolane (DOL), 1,2-dimethoxyethane (DME), tetraethylene glycol dimethylether (TEGDME), poly(ethylene glycol)dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether (e.g. methyl perfluorobutyl ether, MFE, or ethyl perfluorobutyl ether, EFE), and combinations thereof.

The lithium salt may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

The ionic liquid is composed of ions only. Ionic liquids are low melting temperature salts that are in a molten or liquid state when above a desired temperature. For instance, an ionic salt is considered as an ionic liquid if its melting point is below 100° C. If the melting temperature is equal to or lower than room temperature (25° C.), the salt is referred to as a room temperature ionic liquid (RTIL). The IL-based lithium salts are characterized by weak interactions, due to the combination of a large cation and a charge-delocalized anion. This results in a low tendency to crystallize due to flexibility (anion) and asymmetry (cation).

Some ILs may be used as a co-solvent (not as a salt) to work with the first organic solvent of the present disclosure. A well-known ionic liquid is formed by the combination of a 1-ethyl-3-methyl-imidazolium (EMI) cation and an N,N-bis(trifluoromethane)sulphonamide (TFSI) anion. This combination gives a fluid with an ionic conductivity comparable to many organic electrolyte solutions, a low decomposition propensity and low vapor pressure up to ~300-400° C. This implies a generally low volatility and non-flammability and, hence, a much safer electrolyte solvent for batteries.

Ionic liquids are basically composed of organic or inorganic ions that come in an unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide and hexafluorophosphate as anions. Useful ionic liquid-based lithium salts (not solvent) may be composed of lithium ions as the cation and bis(trifluoromethanesulphonyl)imide, bis(fluorosulphonyl)imide and hexafluorophosphate as anions. For instance, lithium trifluoromethanesulfonimide (LiTFSI) is a particularly useful lithium salt.

Based on their compositions, ionic liquids come in different classes that include three basic types: aprotic, protic and zwitterionic types, each one suitable for a specific application. Common cations of room temperature ionic liquids (RTILs) include, but are not limited to, tetraalkylammonium, di, tri, and tetra-alkylimidazolium, alkylpyridinium, dialkyl-pyrrolidinium, dialkylpiperidinium, tetraalkylphosphonium, and trialkylsulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3S)_3^-$, $N(SO_2CF_3)_2^-$, $N(COCF_3)(SO_2CF_3)^-$, $N(SO_2F)_2^-$, $N(CN)_2$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte co-solvent in a rechargeable lithium cell.

There is also no restriction on the type of the cathode materials that can be used in practicing the present disclosure. For Li—S cells, the cathode active material may contain lithium polysulfide. If the cathode active material includes lithium-containing species (e.g., lithium polysulfide) when the cell is made, there is no need to have a lithium metal pre-implemented in the anode.

There are no particular restrictions on the types of cathode active materials that can be used in the presently disclosed lithium battery, which can be a primary battery or a secondary battery. The rechargeable lithium metal or lithium-ion cell may preferably contain a cathode active material selected from, as examples, a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In a rechargeable lithium cell, the cathode active material may be selected from a metal oxide, a metal oxide-free inorganic material, an organic material, a polymeric material, sulfur, lithium polysulfide, selenium, or a combination thereof. The metal oxide-free inorganic material may be selected from a transition metal fluoride, a transition metal chloride, a transition metal dichalcogenide, a transition metal trichalcogenide, or a combination thereof. In a particularly useful embodiment, the cathode active material is selected from $FeF_3$, $FeCl_3$, $CuCl_2$, $TiS_2$, $TaS_2$, $MoS_2$, $NbSe_3$, $MnO_2$, $CoO_2$, an iron oxide, a vanadium oxide, or a combination thereof, if the anode contains lithium metal as the anode active material. The vanadium oxide may be preferably selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. For those cathode active materials containing no Li element therein, there should be a lithium source implemented in the cathode side to begin with. This can be any compound that contains a high lithium content, or a lithium metal alloy, etc.

In a rechargeable lithium cell (e.g., the lithium-ion battery cell), the cathode active material may be selected to contain a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

Particularly desirable cathode active materials comprise lithium nickel manganese oxide ($LiNi_aMn_{2-a}O_4$, $0<a<2$), lithium nickel manganese cobalt oxide ($LiNi_nMn_mCo_{1-n-m}O_2$, $0<n<1$, $0<m<1$, $n+m<1$), lithium nickel cobalt aluminum oxide ($LiNi_cCo_dAl_{1-c-d}O_2$, $0<c<1$, $0<d<1$, $c+d<1$), lithium manganate ($LiMn_2O_4$), lithium iron phosphate ($LiFePO_4$), lithium manganese oxide ($LiMnO_2$), lithium cobalt oxide ($LiCoO_2$), lithium nickel cobalt oxide ($LiNi_pCo_{1-p}O_2$, $0<p<1$), or lithium nickel manganese oxide ($LiNi_qMn_{2-q}O_4$, $0<q<2$).

In a preferred lithium metal secondary cell, the cathode active material preferably contains an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof. Again, for those cathode active materials containing no Li element therein, there should be a lithium source implemented in the cathode side to begin with.

In another preferred rechargeable lithium cell (e.g. a lithium metal secondary cell or a lithium-ion cell), the cathode active material contains an organic material or polymeric material selected from Poly(anthraquinonyl sulfide) (PAQS), lithium oxocarbons (including squarate, croconate, and rhodizonate lithium salts), oxacarbon (including quinines, acid anhydride, and nitrocompound), 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material (redox-active structures based on multiple adjacent carbonyl groups (e.g., "$C_6O_6$"-type structure, oxocarbons), Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile (HAT(CN)6), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, $Li_4C_6O_6$, $Li_2C_6O_6$, $Li_6C_6O_6$, or a combination thereof.

The thioether polymer may be selected from Poly[methanetetryl-tetra(thiomethylene)] (PMTTM), Poly(2,4-dithiopentanylene) (PDTP), or Poly(ethene-1,1,2,2-tetrathiol) (PETT) as a main-chain thioether polymer, in which sulfur atoms link carbon atoms to form a polymeric backbones. The side-chain thioether polymers have polymeric main-chains that include conjugating aromatic moieties, but having thioether side chains as pendants. Among them Poly(2-phenyl-1,3-dithiolane) (PPDT), Poly(1,4-di(1,3-dithiolan-2-yl)benzene) (PDDTB), poly(tetrahydrobenzodithiophene) (PTHBDT), and poly[1,2,4,5-tetrakis(propylthio)benzene] (PTKPTB) have a polyphenylene main chain, linking thiolane on benzene moieties as pendants. Similarly, poly[3,4 (ethylenedithio)thiophene] (PEDTT) has polythiophene backbone, linking cyclo-thiolane on the 3,4-position of the thiophene ring.

In yet another preferred rechargeable lithium cell, the cathode active material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. This class of lithium secondary batteries has a high capacity and high energy density. Again, for those cathode active materials containing no Li element therein, there should be a lithium source implemented in the cathode side to begin with.

Figure 1B:
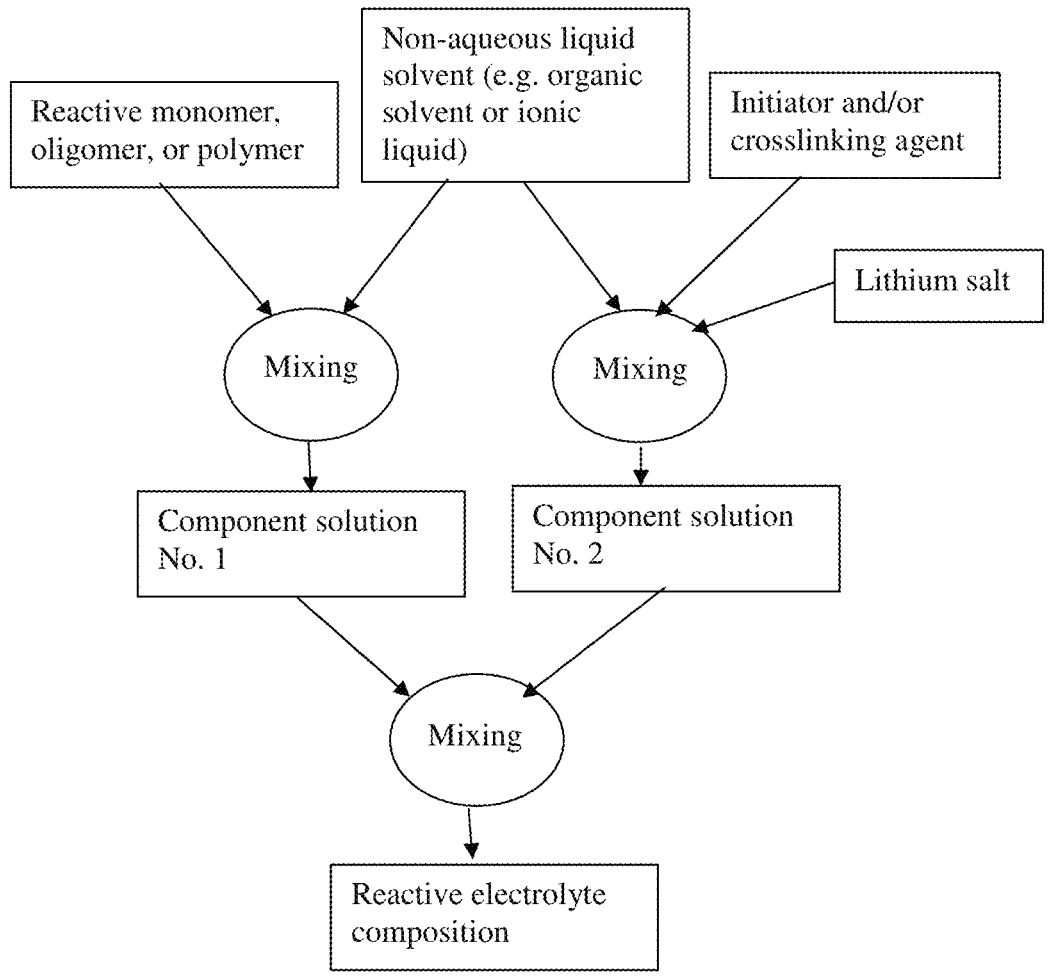
FIG. 1(B) A process flow chart to illustrate the method of producing a reactive electrolyte composition according to some embodiments of the present disclosure.

As illustrated in FIG. 1(B), the present disclosure also provides an electrolyte composition comprising: (a) a first solution, comprising a reactive additive and a first non-aqueous liquid solvent (e.g., an organic solvent or ionic liquid solvent), wherein the reactive additive comprises at least one reactive polymer, reactive oligomer, or reactive monomer and wherein the reactive polymer, oligomer, or monomer comprises at least a reactive carboxylic and/or a hydroxyl group; and (b) a second solution, comprising an initiator or crosslinking agent, a lithium salt, and a second aqueous liquid solvent (e.g., an organic solvent or ionic liquid solvent); wherein the first solution and the second solution are stored separately before the first solution and the second solution are mixed to form the electrolyte.

The disclosure further provides a method of producing a rechargeable lithium cell (as illustrated in FIG. 1(A)), the method comprising: (a) providing a cathode; (b) providing an anode; (c) combining the cathode and the anode to form a dry cell; and (d) introducing (e.g., injecting) the presently disclosed electrolyte composition into the dry cell and polymerizing and/or crosslinking the reactive additive to produce the rechargeable lithium cell.

In this method, step (a) may be selected from any commonly used cathode production process. For instance, the process may include (i) mixing particles of a cathode active material, a conductive additive, an optional resin binder, optional particles of a solid inorganic electrolyte powder, and an optional flame retardant in a liquid medium (e.g., an organic solvent, such as NMP) to form a slurry; and (ii) coating the slurry on a cathode current collector (e.g., an Al foil) and removing the solvent. The anode in step (b) may be produced in a similar manner, but using particles of an anode active material (e.g., particles of Si, SiO, Sn, $SnO_2$, graphite, and carbon). The liquid medium used in the production of an anode may be water or an organic solvent. Step (c) may entail combining the anode, a porous separator, the cathode, along with their respective current collectors, to form a unit cell which is enclosed in a protective housing to form a dry cell.

Figure 1C:
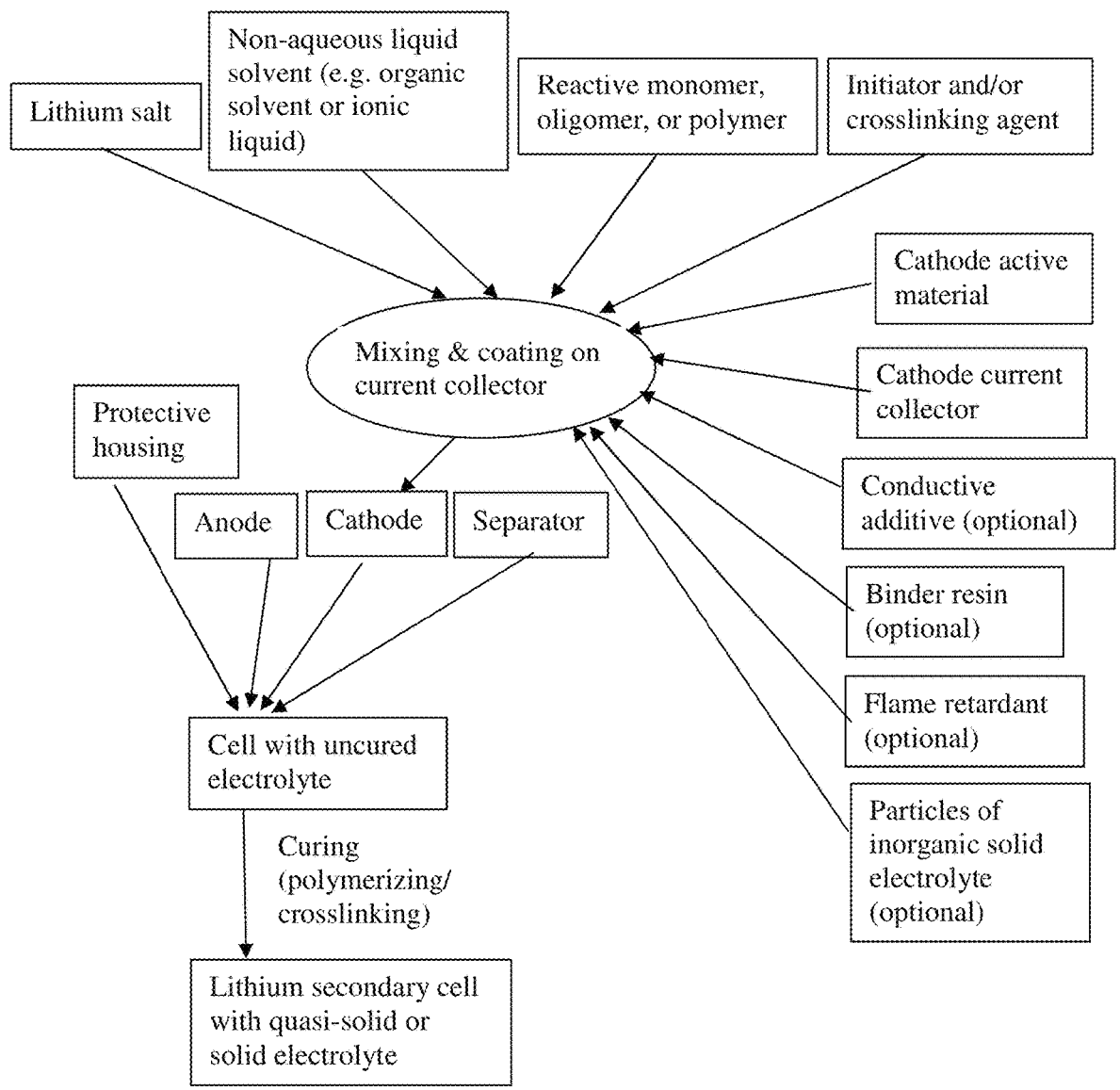
FIG. 1(C) A process flow chart to illustrate a method of producing a lithium metal battery comprising a substantially solid-state electrolyte according to some embodiments of the present disclosure.

As illustrated in FIG. 1(C), the disclosure also provides a method of producing the disclosed rechargeable lithium cell, the method comprising: (A) mixing particles of a cathode active material, an optional conductive additive (typically required in the cathode), an optional binder (optional but not required since, upon polymerization and/or crosslinking, the reactive additive becomes a binder that bonds the solid particles in the electrode together), an optional flame retardant, optional particles of an inorganic solid electrolyte powder, a reactive additive, a non-aqueous liquid solvent, and a lithium salt to form a cathode, wherein the reactive additive comprises at least one reactive polymer, reactive oligomer, or reactive monomer and a curing agent or initiator and wherein the reactive polymer, oligomer, or monomer comprises at least a reactive carboxylic and/or a hydroxyl group; (B) providing an anode; (C) combining the cathode and the anode to form a cell; and (D) polymerizing and/or crosslinking the reactive additive, prior to or after step (C), to produce the rechargeable lithium cell.

In step (A), particles of a cathode active material, an optional conductive additive, an optional binder, an optional flame retardant, optional particles of an inorganic solid electrolyte powder, a reactive additive, and a lithium salt may be dispersed in a non-aqueous liquid solvent to form a slurry. The slurry is attached to or coated on a primary surface or both primary surfaces of a cathode current collector (e.g., Al foil) to form a cathode.

In certain embodiments, step (B) comprises a procedure of mixing particles of an anode active material, an optional conductive additive (not required if the anode active material is a carbon or graphite material), an optional binder (not required since, upon polymerization and/or crosslinking, the reactive additive becomes a binder that bonds the solid particles in the electrode together), an optional flame retardant, optional particles of an inorganic solid electrolyte powder, a reactive additive (the same or different reactive as used in the cathode), a non-aqueous liquid solvent, and a lithium salt to form an anode.

The method further comprises polymerizing and/or crosslinking the reactive additive, prior to or after step (C), to produce the rechargeable lithium cell.

In some embodiments, step (A) further comprises adding particles of an inorganic solid electrolyte powder in the cathode. Step (B) may further comprise adding particles of an inorganic solid electrolyte powder in the anode.

Figure 1D:
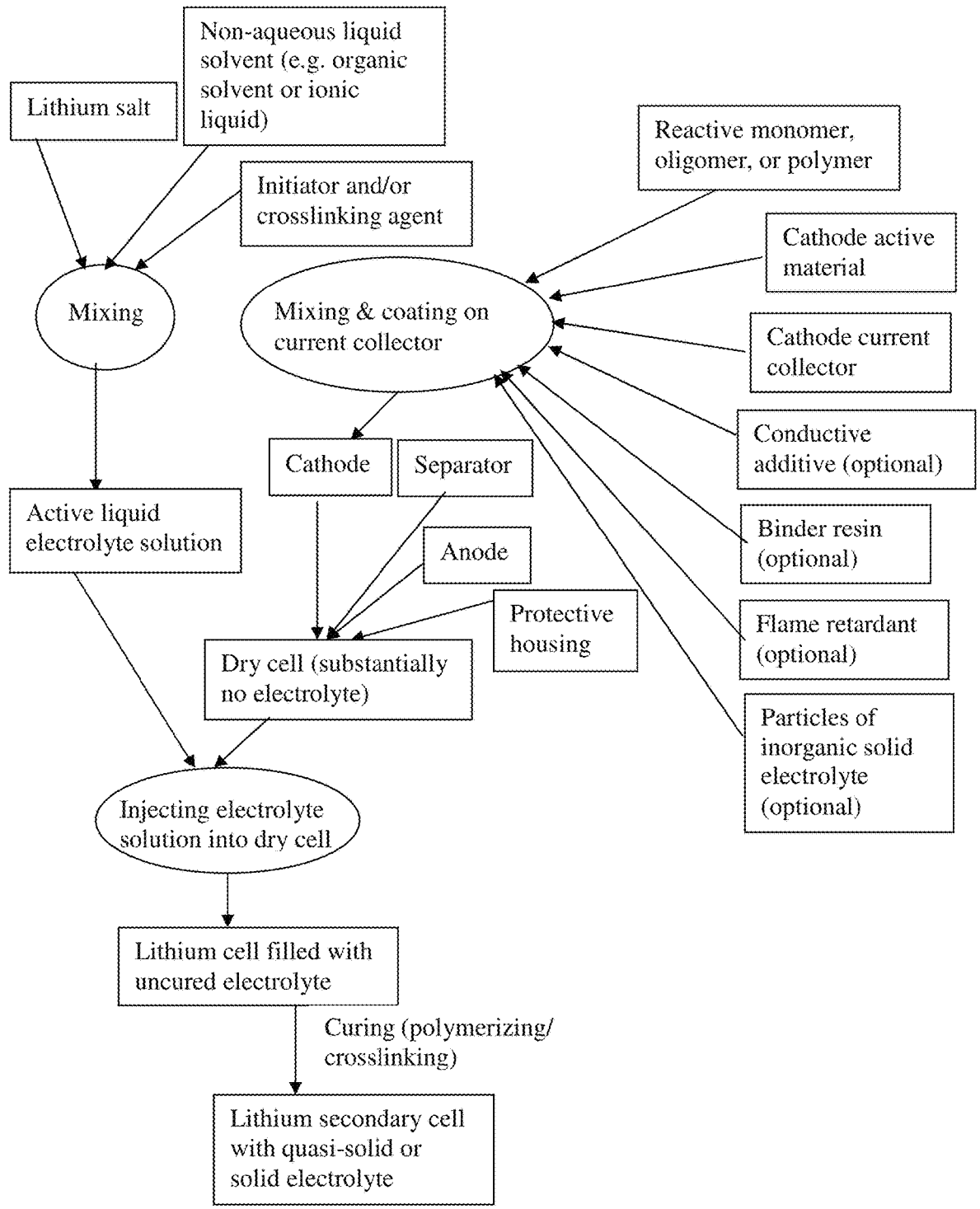
FIG. 1(D) A process flow chart to illustrate a method of producing a lithium metal battery comprising a substantially solid-state electrolyte according to some embodiments of the present disclosure.

Illustrated in FIG. 1(D) is yet another embodiment of the present disclosure, which is a method of producing the disclosed rechargeable lithium cell. The method comprises: (A) mixing particles of a cathode active material, an optional conductive additive (typically required in the cathode), an optional binder (not required since the reactive additive becomes a binder upon polymerization and/or crosslinking), an optional flame retardant, optional particles of an inorganic solid electrolyte powder, and a reactive additive to form a cathode (preferably containing at least one cathode active material layer supported on a current collector), wherein the reactive additive comprises at least one reactive polymer, reactive oligomer, or reactive monomer and wherein the reactive polymer, oligomer, or monomer comprises at least a reactive carboxylic and/or a hydroxyl group; (B) providing an anode; (C) combining the cathode, an optional separator, the anode, and a protective housing to form a cell; and (D) injecting a liquid mixture of a lithium salt, an initiator or crosslinking agent, an optional flame retardant (if in a liquid state) and a non-aqueous liquid solvent into the cell and polymerizing and/or crosslinking the reactive additive to produce the rechargeable lithium cell.

For the production of a lithium-ion cell, step (B) may comprise mixing particles of an anode material (e.g., Si, SiO, graphite, carbon particles, etc.), an optional conductive additive, an optional binder, an optional flame retardant, optional particles of an inorganic solid electrolyte powder, and a reactive additive to form at least one anode active layer supported on an anode current collector (e.g., Cu foil).

The following examples are presented primarily for the purpose of illustrating the best mode practice of the present disclosure, not to be construed as limiting the scope of the present disclosure.

Example 1: Anode-Less Lithium Battery Containing an Elastic Polymer-Based Electrolyte A PAA/PVA crosslinked network polymer-based elastic polymer electrolyte was prepared by a thereto-induced polymerization approach. The reactive solution or slurry was prepared by mixing a polymer precursor (PAA and PVA aqueous solution, weight ratio of 9:1), particles of a cathode active material: and NCM-811, separately), a desired amount of LiOH (LiOH-to-polymer ratio=$1/10$), and a desired amount of selected flame retardant (e.g., aluminum hydroxide and a phosphorus compound, Chemical Formula 7 below, from Amfine Chemical Corp.).

(Chemical Formula 7)

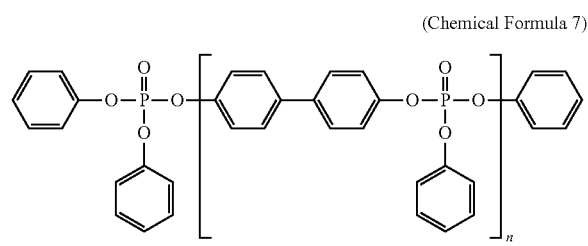

The mixture was stirred for 3 hours, followed by casting onto an Al foil surface to form a cathode layer. The prepared layer was then thermo-polymerized by heating at 120° C. for 5 hours and then at 150° C. for 2 hours. The etherification reaction took place between the carboxyl functional group (—COOH) of PAA and the hydroxyl functional group (—OH) of PVA.

On a separate basis, some amount of the PVA/PAA aqueous solution was cast onto a glass surface to form a wet film, which was thermally cured under similar conditions to form a film of cross-linked polymer. In this experiment, the PAA/PVA weight ratio was varied from 1/9 to 9/1 to vary the degree of cross-linking in several different polymer films. Some of the cure polymer samples were subjected to dynamic mechanical testing to obtain the equilibrium dynamic modulus, Ge, for the determination of the number average molecular weight between two cross-link points (Mc) and the corresponding number of repeat units (Nc), as a means of characterizing the degree of cross-linking.

Several tensile testing specimens were cut from each cross-linked film and tested with a universal testing machine. The representative tensile stress-strain curves indicate that this series of network polymers have an elastic deformation from approximately 55% to 345%. These above are for neat polymers without any additive. The addition of up to 30% by weight of a lithium salt typically reduces this elasticity down to a reversible tensile strain from 10% to 100%.

Several layers of lightly crosslinked PAA/PVA network polymer were soaked in a liquid electrolyte solution comprising 2.5 M of lithium hexafluorophosphate (LiPF$_6$) in a liquid mixture of EC/VC/HEC (weight ratio of (8:1:1) in a glove box for 24 hours to obtain anode protective layers. A Cu foil, an anode protective layer, a porous PE-PP separator, and a cathode layer as described above are stacked and enclosed in an Al-plastic laminate envelop to form an anode-less lithium metal cell. Instead of soaking, one may choose to inject liquid electrolyte after a dry cell is made.

Electrochemical measurements (CV curves) were carried out in an electrochemical workstation at a scanning rate of 1-100 mV/s. The electrochemical performance of the cells was evaluated by galvanostatic charge/discharge cycling at a current density of 50-500 mA/g using an Arbin electrochemical workstation.

Example 2: Na$^+$-Substituted Polyacrylic Acid Polymer Electrolyte in a Lithium-LiCoO$_2$ Cell (initially the Cell Being Lithium-Free) and a Graphite-LiCoO$_2$ Lithium-Ion Cell The polymer in the intended electrolyte was based on 18 wt % of a polyacrylic acid aqueous solution (10 wt % concentration) or acrylic acid monomer (as a curing agent for polyvinyl alcohol), and 8 wt % of NaOH, and 74 wt % of polyvinyl alcohol. Particles of LiCoO$_2$ as a cathode active material and multi-walled carbon nanotubes as a conductive additive were mixed with the polymer solution (final LiCoO$_2$:polymer:CNT ration=8:1:1) and coated on a surface of Al foil. Upon coating, the resulting reactive mass was heated at 120° C. for 60 minutes to produce a cross-linked compound of Na$^+$-substituted polyacrylic acid and polyvinyl alcohol that is in physical contact with both CNT and LiCoO$_2$ in the cathode. The cathode was soaked in a liquid electrolyte containing a lithium salt dissolved in an organic liquid solvent, allowing the liquid electrolyte to penetrate and slightly swell the crosslinked polymer network.

The anode for a lithium-ion cell was prepared in a similar manner, but the LiCoO$_2$ particles were replaced by graphene-coated Si particles as an anode active material.

Separately, the reacting mass was cast onto a glass surface to form several films which were cured to obtain cross-linked polymers having different degrees of cross-linking. Tensile testing was also conducted on these films. This series of cross-linked polymers can be elastically stretched up to approximately 43% (higher degree of cross-linking) to 445% (lower degree of cross-linking).

In some samples, a desired amount (5% by weight based on a total electrode weight) of a flame retardant (e.g. decabromodiphenyl ethane (DBDPE), brominated poly(2,6-dimethyl-1,4-phenylene oxide) (BPPO), and melamine-based flame retardant, separately; the latter from Italmatch Chemicals) was then added into the reactive mass.

In several samples, a garnet-type solid electrolyte (Li$_7$La$_3$Zr$_2$O$_{12}$ (LLZO) powder) was also added into the solution. Subsequently, these solutions were separately cast to form a thin layer of precursor reactive mass onto an Al foil. The precursor reactive mass was then heated at a temperature from 75 to 100° C. for 2 to 8 hours to obtain a layer of anode adhered to the Cu foil surface or cathode adhered to an Al foil surface.

For the construction of a lithium-ion cell, a graphene-coated Si particle-based anode, a porous separator, and a LiCoO$_2$—based cathode were stacked and housed in a plastic/Al laminated envelop to form a cell.

For the construction of a lithium-ion cell, a Cu foil, a porous separator, and a LiCoO$_2$—based cathode were stacked and housed in a plastic/Al laminated envelop to form a cell.

Example 3: Li Metal Cells Containing a Semi-Interpenetrating Network Polymer-Based Electrolyte Several elastic polymer electrolytes were obtained from a semi-interpenetrating network polymer including (a) a copolymer containing a repeating unit represented by the following Chemical Formula 8 and a repeating unit represented by the following Chemical Formula 9 and (ii) acrylamide or alkylene glycol as a curing agent).

(Chemical Formula 8)

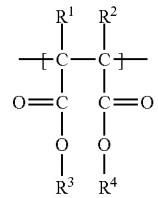

(Chemical Formula 9)

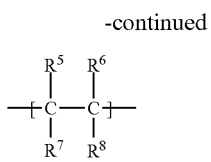

In an example, 390 g of deionized water, 25 g of isobutylene-co-maleic anhydride, and 10 g of polyethylene glycol were introduced into a 2 L reactor having a heater, a cooler, and an agitator. An aqueous solution prepared by dissolving 8.0 g of lithium hydroxide in 80 g of deionized water at room temperature was slowly added into this reactor, and the mixture was agitated for 10 minutes. The reactor was heated up to 80° C. under nitrogen atmosphere and maintained for 3 hours. Subsequently, a solution prepared by dissolving 0.125 g of ammonium persulfate in 10 g of deionized water was added to the mixture, which was maintained for 20 minutes, and an aqueous solution prepared by dissolving 65 g of acrylamide in 180 g of deionized water was added thereto in a dropwise fashion for 2 hours. Commercially available NCM-532 powder (well-known lithium nickel cobalt manganese oxide), along with graphene sheets (as a conductive additive), were added into the solution. The mixture was reacted for 1 hour and cooled down to lower than 40° C. An aqueous solution prepared by dissolving lithium 2.9 g of hydroxide in 20 g of deionized water was added thereto in a dropwise fashion for 10 minutes. The slurry was coated onto an Al foil to form a cathode layer, Upon curing, the polymer included a semi-interpenetrating polymer network including a copolymer including a repeating unit represented by Chemical Formula 8 and a repeating unit represented by Chemical Formula 9 and polyacrylamide, and polyalkylene glycol, and included free lithium ion.

In this example, in the above Chemical Formula 8, $R^1$ and $R^2$ are hydrogen, and $R^3$ and $R^4$ are Li. In the above Chemical Formula 9, $R^5$ and $R^7$ are hydrogen, and $R^6$ and $R^8$ are $CH_3$. The repeating unit represented by the above Chemical Formula 8 was included in an amount of 40 mol % based on the total amount of the copolymer, and the repeating unit represented by the above Chemical Formula 9 was included in an amount of 60 mol % based on the total amount of the copolymer. Furthermore, in the semi-interpenetrating polymer network, a mole ratio of the copolymer to the polyacrylamide was 3:7, The amount of the semi-interpenetrating polymer was 90 mol % and that of polyalkylene glycol was 10 mole % in the elastic polymer composition. The weight-average molecular weight of the polyalkylene, glycol was 3000 g/mol, and the amount of free lithium ion was 6.6 mol %.

In some samples, a flame retardant (e.g. triphenylphosphate (TPP) and "Phoslite", a phosphorus compound from Italmatch Chemicals) was dispersed in the elastic polymer, prior to being cast onto a lithium metal layer pre-deposited on a Cu foil surface to form a precursor film, which was polymerized and cured at 70° C. for half an hour to obtain a lightly cross-linked polymer.

An Al foil-supported cathode active layer, a separator, and a Cu foil-supported lithium metal foil were then assembled into a lithium metal cell, followed by injection of a liquid electrolyte into this cell. The liquid electrolyte containing LiTFSI (lithium salt) dissolved in a liquid mixture of (DME+DOL+FPC).

Example 4: Li-Ion Cells Containing a Crosslinked CMC/PAA Network-Based Elastic Polymer Electrolyte A crosslinked polymer network of CMC/PAA chains was prepared according to the following procedure: The PAA crosslinked CMC network polymer was prepared by a thermo-induced polymerization and crosslinking approach. The reactive slurry was prepared by mixing 100 mg CMC, 400 mg acrylic acid monomer (AA), 40 mg $(NH_4)_2S_2O_8$, and 12 mg $NaHSO_3$ in 12 mL water. The solution was heated at 45-50° C. for 2-3 hours, and was neutralized by NaOH to a pH value of 6.2. Approximately 3 g of SiO powder (as an anode active material) was added into the solution. The resulting slurry was stirred for 2 hours and then cast to form layers of reactive mass, which were then heat treated at 115° C. for 5 hours and then at 150° C. for 2 hours to form an anode active layer on a Cu foil surface. The etherification reaction presumably took place between the carboxyl functional group (—COOH) of PAA and the hydroxyl functional group (—OH) of CMC.

On a separate basis, cathode layers supported on Al foil surface were produced in a similar manner, but SiO was replaced by particles of lithium manganate ($LiMn_2O_4$). Lithium-ion cells were then produced by combining an anode, a separator, and a cathode layer into a cell protected by a casing. The cell was then injected with a desired liquid electrolyte.

On a separate basis, some amount of the CMC/PAA aqueous solution was cast onto a glass surface to form a wet film, which was thermally cured under similar conditions to form films of cross-linked polymer. In this experiment, the PAA/CMC weight ratio was varied from 1/9 to 9/1 to vary the degree of cross-linking in several different polymer films. Some of the cure polymer samples were subjected to dynamic mechanical testing to obtain the equilibrium dynamic modulus, Ge, for the determination of the number average molecular weight between two cross-link points (Mc) and the corresponding number of repeat units (Nc), as a means of characterizing the degree of cross-linking.

Several tensile testing specimens were cut from each cross-linked film and tested with a universal testing machine. The representative tensile stress-strain curves indicate that this series of network polymers have an elastic deformation from approximately 22% to 310%.

Example 5: Elastic Polymer Electrolyte from Crosslinked Polyacrylic Acid Using Citric Acid and Glycerol as a Curing Agent The high-elasticity polymer electrolyte was made from a mixture of PAA, citric acid, and glycerol. The PAA, citric acid and glycerol were mixed to have a ratio of 8:1:1. For preparation of a cathode, PAA (7% by weight), particles of a cathode active material (85%), and a conductive additive (carbon black, 8%) were dispersed in distilled water to form an aqueous slurry. The cathode active materials studied included NCM, NCA, and lithium polysulfide. The slurry was coated onto a surface of an Al foil to form a dry cathode layer upon removal of water.

An anode layer was made on a Cu foil surface in a similar manner; but the anode active materials are graphene-coated Si particles. An anode layer, a separator, and a cathode layer were combined to form a dry cell. A liquid electrolyte solution containing a lithium salt ($LiBF_4$), citric acid, glycerol, and an organic solvent (EC+acetone) was the injected into the dry cell. Acetone was subsequently vaporized. The cell was heated to 100° C. for 2 hours and then 150° C. for 2 hours to form a gel polymer network electrolyte.

EXAMPLE 6: Citric Acid-Crosslinked CMC as an Elastic Polymer Electrolyte

CMC solution (2% w/v) was prepared by adding sodium carboxymethyl cellulose powder (2.0 g) to 100 mL of DI water and stirring at room temperature until complete solubilization occurred. After dissolution, desired amounts of cathode active material and conductive additive (e.g., CNTs) were dispersed in the resulting solution to form a slurry. The slurry was subsequently coated onto a surface of an Al foil and water was removed to form a dry cathode layer. A layer of anode was made in a similar manner A cathode, a separator (porous PE-PP copolymer membrane), and an anode were stacked to form a dry cell, which was enclosed in a pouch.

Subsequently, citric acid (CA, as an intended crosslinking agent) and a lithium salt were dispersed in an organic liquid solvent (EC+DEC+FEC at a ratio of 7.0:1.5:1.5) to form a solution, which was injected into the dry cell. The cell was heated at 80 ±2° C. for 24 h to complete the crosslinking reaction of CMC by citric acid.

Example 7: PEGDE-Crosslinked CMC as an Elastic Polymer Electrolyte

A series of CMC-based network polymers crosslinked by polyethylene glycol diglycidyl ether (PEGDE) was prepared. A typical procedure was performed as follows: 5.0 g of CMC (23 mmol for monomeric unit) was completely dissolved in 100 mL of 1.5 mol L$^{-1}$ aqueous NaOH solution, and 0.50 g of PEGDE (1.1 mmol) was subsequently added to the solution with stirring at 300 rpm using a Teflon impeller at 25° C. to form a reactive solution. Particles of a cathode active material (e.g. LiCoO2 and NCM532, separately) and a desired amount (5-10% of the total cathode active layer weight) of an inorganic solid electrolyte powder (e.g., c-Li$_{6.25}$Al$_{0.25}$La$_3$Zr$_2$O$_{12}$ prepared in Example 10) were then dispersed in the reactive solution to form a reactive slurry. The slurry was coated on an Al foil surface and dried to make a cathode. An anode was made in a similar manner. A cathode, a separator (porous PE-PP copolymer membrane), and an anode were stacked to form a dry cell, which was enclosed in a pouch.

Subsequently, a lithium salt (LiPF$_6$), was dispersed in an organic liquid solvent (EC+VC+HFE at a ratio of 7.5:1.0:1.5) to form a solution, which was injected into the dry cell. The crosslinking reaction was initiated at 60° C. and maintained at 60° C. for 4 hours to complete the crosslinking reaction.

Example 8: Preparation of Solid Electrolyte Powder, Lithium Nitride Phosphate Compound (LIPON) for Use as a Solid Filler or Additive Particles of Li$_3$PO$_4$ (average particle size 4 μm) and urea were prepared as raw materials; 5 g each of Li$_3$PO$_4$ and urea was weighed and mixed in a mortar to obtain a raw material composition. Subsequently, the raw material composition was molded into 1 cm×1 cm×10 cm rod with a molding machine, and the obtained rod was put into a glass tube and evacuated. The glass tube was then subjected to heating at 500° C. for 3 hours in a tubular furnace to obtain a lithium nitride phosphate compound (LIPON). The compound was ground in a mortar into a powder form. These particles can be added into an elastic polymer matrix, along with a desired anode active material or cathode active material to make an anode or a cathode, respectively.

Example 9: Preparation of Solid Electrolyte Powder, Lithium Superionic Conductors with the Li$_{10}$GeP$_2$S$_{12}$ (LGPS)-Type Structure The starting materials, Li$_2$S and SiO$_2$ powders, were milled to obtain fine particles using a ball-milling apparatus. These starting materials were then mixed together with P$_2$S$_5$ in the appropriate molar ratios in an Ar-filled glove box. The mixture was then placed in a stainless steel pot, and milled for 90 min using a high-intensity ball mill. The specimens were then pressed into pellets, placed into a graphite crucible, and then sealed at 10 Pa in a carbon-coated quartz tube. After being heated at a reaction temperature of 1,000° C. for 5 h, the tube was quenched into ice water. The resulting solid electrolyte material was then subjected to grinding in a mortar to form a powder sample to be later added as an inorganic solid electrolyte particles dispersed in an intended elastic polymer matrix.

Example 10: Preparation of Garnet-Type Solid Electrolyte Powder

The synthesis of the c-Li$_{6.25}$Al$_{0.25}$La$_3$Zr$_2$O$_{12}$ was based on a modified sol-gel synthesis-combustion method, resulting in sub-micron-sized particles after calcination at a temperature of 650° C. (J. van den Broek, S. Afyon and J. L. M. Rupp, Adv. Energy Mater., 2016, 6, 1600736).

For the synthesis of cubic garnet particles of the composition c-Li$_{6.25}$Al$_{0.25}$La$_3$Zr$_2$O$_{12}$, stoichiometric amounts of LiNO$_3$, Al(NO$_3$)$_3$-9H$_2$O, La(NO$_3$)$_3$-6(H$_2$O), and zirconium (IV) acetylacetonate were dissolved in a water/ethanol mixture at temperatures of 70° C. To avoid possible Li-loss during calcination and sintering, the lithium precursor was taken in a slight excess of 10 wt % relative to the other precursors. The solvent was left to evaporate overnight at 95° C. to obtain a dry xerogel, which was ground in a mortar and calcined in a vertical tube furnace at 650° C. for 15 h in alumina crucibles under a constant synthetic airflow. Calcination directly yielded the cubic phase c-Li$_{6.25}$Al$_{0.25}$La$_3$Zr$_2$O$_{12}$, which was ground to a fine powder in a mortar for further processing.

The c-Li$_{6.25}$Al$_{0.25}$La$_3$Zr$_2$O$_{12}$ solid electrolyte pellets with relative densities of ~87±3% made from this powder (sintered in a horizontal tube furnace at 1070° C. for 10 h under O$_2$ atmosphere) exhibited an ionic conductivity of ~0.5× 10$^{-3}$ S cm$^{-1}$ (RT). The garnet-type solid electrolyte with a composition of c-Li$_{6.25}$Al$_{0.25}$La$_3$Zr$_2$O$_{12}$ (LLZO) in a powder form was dispersed in several electric, ion-conducting polymers discussed earlier.

Example 11: Preparation of Sodium Superionic Conductor (NASICON) Type Solid Electrolyte Powder The Na$_{3.1}$Zr$_{1.95}$M$_{0.05}$Si$_2$PO$_{12}$ (M=Mg, Ca, Sr, Ba) materials were synthesized by doping with alkaline earth ions at octahedral 6-coordination Zr sites. The procedure employed includes two sequential steps. Firstly, solid solutions of alkaline earth metal oxides (MO) and ZrO$_2$ were synthesized by high energy ball milling at 875 rpm for 2 h. Then NASICON Na$_{3.1}$Zr$_{1.95}$M$_{0.05}$Si$_2$PO$_{12}$ structures were synthesized through solid-state reaction of Na$_2$CO$_3$, Zr$_{1.95}$M$_{0.05}$O$_{3.95}$, SiO$_2$, and NH$_4$H$_2$PO$_4$ at 1260° C.

Example 12: Flash Points and Vapor Pressure of Some Solvents and Additives and Corresponding Quasi-solid Electrolytes with a Lithium Salt Molecular Ratio of x=0.2

The flash points of several solvents (with or without a liquid flame retardant additive) and their electrolytes having a lithium salt molecular ratio x=0.2 are presented in Table 1 below. It may be noted that, according to the OSHA (Occupational Safety & Health Administration) classification, any liquid with a flash point below 38.7° C. is flammable. However, in order to ensure safety, we have designed our quasi-solid electrolytes to exhibit a flash point significantly higher than 38.7° C. (by a large margin, e.g. at least increased by 50°, preferably above 150° C., and most preferably above 250° C.). The data in Table 1 indicate that the addition of a lithium salt to a molecular ratio of 0.2 is normally sufficient to meet these criteria provided a desired amount of a select polymer is added into the liquid solvent. The addition of such a polymer was found to substantially totally suppress the flash point.

TABLE 1

The flash points and vapor pressures of select solvents and their electrolytes with a lithium salt molecular ratio x = 0.2 (approximately 2.5M).

| Liquid solvent | Flash point (° C.) | Liquid additive (additive/ solvent = 25/75) | Flash point (° C.) with x = 0.2 of (Li salt) |
|---|---|---|---|
| DOL (1,3-dioxolane) | 1 | none | 35 (LiBF$_4$) |
| DOL | | TEGDME | 150 (LiBF$_4$) |
| DOL | 1 | none | 76 (LiCF$_3$SO$_3$) |
| DOL | | Ethylene sulfate (DTD) | 155 (LiCF$_3$SO$_3$) |
| DEC (diethyl carbonate) | 33 | none | 120 (LiCF$_3$SO$_3$) |
| DEC | | FPC (Trifluoro propylene carbonate) | >200 (LiCF$_3$SO$_3$) |
| DMC (Dimethyl carbonate) | 18 | none | 87 (LiCF$_3$SO$_3$) |
| DMC | | hydrofluoro ether | >180 (LiCF$_3$SO$_3$) |
| EMC (ethyl methyl carbonate) | 23 | none | 88 (LiBOB) |
| EMC | | MFE | >200 (LiBOB) |
| AN (Acetonitrile) | 6 | none | 65 (LiBF$_4$) |
| AN | | 1,3-propane sultone (PS) | 155 (LiBF$_4$) |
| AN | | Canola oil | 160 (LiBF$_4$) |
| EA (Ethyl acetate) + DOL | −3 | none | 70 (LiBF$_4$) |
| EA + DOL | | Triallyl phosphate (TAP) | >180 (LiBF$_4$) |
| DME (1,2-dimethoxyethane) | −2 | | 55 (LiPF$_6$) |
| DME | | liquid silaxane | 155 (LiPF$_6$) |
| VC (vinylene carbonate) | 53.1 | none | 65 (LiPF$_6$) |
| VC | | Alkyylsilane (Si—C) | >200 (LiPF$_6$) |

*As per OSHA (Occupational Safety & Health Administration) classification, any liquid with flash point below 38.7° C. is flammable.

The invention claimed is:

1. An electrolyte, comprising:
   i. a polymer, which is a polymerization or crosslinking product of a reactive additive, wherein the reactive additive comprises at least one reactive polymer, reactive oligomer, or reactive monomer and a curing agent or initiator and wherein the reactive polymer, reactive oligomer, or reactive monomer comprises at least a reactive carboxylic and/or a hydroxyl group, wherein said polymer comprises a crosslinked network derived from Chemical Formula 6:

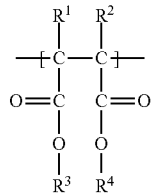

(Chemical Formula 6)

wherein, R$^1$ and R$^2$ are the same or different and are independently selected from hydrogen, or a substituted or unsubstituted C1 to C10 alkyl group, and R$^3$ and R$^4$ are an alkali metal;
   ii. a lithium salt; and
   iii. an organic liquid solvent or ionic liquid.

2. The electrolyte of claim 1, wherein the electrolyte exhibits a vapor pressure less than 0.01 kPa when measured at 20° C., a vapor pressure less than 60% of the vapor pressure of said liquid solvent alone, a flash point at least 20 degrees Celsius higher than a flash point of said liquid solvent alone, a flash point higher than 150° C., or no measurable flash point.

3. The electrolyte of claim 1, wherein the polymer comprises a high-elasticity polymer having a lithium ion conductivity from $10^{-8}$ S/cm to $5 \times 10^{-2}$ S/cm at room temperature, and a fully recoverable tensile elastic strain from 2% to 1,500% when measured without any additive dispersed therein and wherein the high-elasticity polymer comprises at least a crosslinked polymer network of chains from at least one polymer containing carboxylic and/or hydroxyl groups.

4. The electrolyte of claim 1, wherein said polymer comprises a cross-linked network of chains from poly (acrylic acid), poly(vinyl alcohol), polyethylene glycol, carboxymethyl cellulose, or a combination thereof.

5. The electrolyte of claim 1, wherein said polymer comprises at least one compound selected from poly(acrylic acid), poly(vinyl alcohol), carboxymethyl cellulose (CMC), citric acid, glycerol, a derivative of carboxymethyl cellulose, a derivative of poly(vinyl alcohol), a derivative of poly (acrylic acid), a carboxymethyl cellulose or poly(acrylic acid) substituted with an alkali cation, or a combination thereof, wherein the alkali cation is selected from Li$^+$, Na$^+$, K$^+$, NH$_4^+$, or a combination thereof.

6. The electrolyte of claim 1, wherein said polymer comprises a cross-linked network of carboxymethyl cellulose, vinyl alcohol, or acrylic acid that is crosslinked by a crosslinking agent to a degree of crosslinking that imparts an elastic tensile strain from 5% to 500%.

7. The electrolyte of claim 1, wherein said electrolyte further comprises a flame-retardant additive, different in composition than said liquid solvent and forming a mixture Trifluoro propylene carbonate (FPC), Methyl nonafluorobutyl ether (MFE), Fluoroethylene carbonate (FEC), Tris (trimethylsilyl)phosphite (TTSPi), Triallyl phosphate (TAP), Ethylene sulfate (DTD), 1,3-propane sultone (PS), Propene sultone (PES), Alkylsiloxane (Si—O), Alkyylsilane (Si— C), liquid oligomeric silaxane (—Si—O—Si—), Ttetraethylene glycol dimethylether (TEGDME), canola oil, or a combination thereof and said flame-retardant additive-to-said liquid solvent ratio in said mixture is from 5/95 to 95/5 by weight.

8. The electrolyte of claim 1, wherein said electrolyte further comprises a flame-retardant additive selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

9. The electrolyte of claim 8, wherein said flame retardant additive is in a form of encapsulated particles comprising the additive encapsulated by a shell of a substantially lithium ion-impermeable and liquid electrolyte-impermeable coating material, wherein said shell is breakable when exposed to a temperature higher than a threshold temperature.

10. The electrolyte of claim 1, wherein said polymer forms a mixture, copolymer, semi-interpenetrating network, or simultaneous interpenetrating network with a second polymer selected from polypropylene oxide, poly(ethylene glycol), polyacrylonitrile), poly(methyl methacrylate), poly (vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol)methyl ether acrylate, a sulfonated derivative thereof, or a combination thereof.

11. The electrolyte of claim 1, wherein said polymer further comprises an inorganic solid electrolyte material in a fine powder form having a particle size from 2 nm to 30 μm, wherein said particles of inorganic solid electrolyte material are dispersed in said polymer or chemically bonded by said polymer.

12. The electrolyte of claim 11, wherein said particles of inorganic solid electrolyte material comprise an oxide, sulfide, hydride, halide, borate, phosphate, lithium phosphorus oxynitride (LiPON), garnet, lithium superionic conductor (LISICON), sodium superionic conductor (NASICON), or a combination thereof.

13. The electrolyte of claim 1, wherein said organic liquid solvent is selected from the group consisting of 1,3-dioxolane (DOL), 1,2-dimethoxyethane (DME), tetraethylene glycol dimethylether (TEGDME), poly(ethylene glycol)dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, and combinations thereof.

14. The electrolyte of claim 1, wherein said lithium salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, an ionic liquid-based lithium salt, or a combination thereof.

15. The electrolyte of claim 1, wherein a molar fraction or molecular fraction of said lithium salt in said organic liquid solvent or ionic liquid is greater than 0.2 and up to 0.99.

16. The electrolyte of claim 1, wherein said ionic liquid is selected from a room temperature ionic liquid having a cation selected from tetraalkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof.

17. The electrolyte of claim 1, wherein said ionic liquid is selected from a room temperature ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

* * * * *